US012203294B2

(12) United States Patent
Kelsch et al.

(10) Patent No.: US 12,203,294 B2
(45) Date of Patent: Jan. 21, 2025

(54) SECURITY DEVICE WITH A REMOTELY ACTUATED QUICK-RELEASE MECHANISM

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Douglas Barthold, Oldsmar, FL (US); Joel Jenkins, Wesley Chapel, FL (US); Sarah Johnson, Tampa, FL (US); Chris Nelson, Dunedin, FL (US); Wade Zhu, Land O' Lakes, FL (US); Matthew Kuntz, Phoenix, AZ (US); Lee Eckert, Sarasota, FL (US); John N. Figh, Jr., Tampa, FL (US); Jasen Paul Biggins, Raleigh, NC (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 18/536,663

(22) Filed: Dec. 12, 2023

(65) Prior Publication Data

US 2024/0125152 A1 Apr. 18, 2024

Related U.S. Application Data

(63) Continuation-in-part of application No. 17/730,873, filed on Apr. 27, 2022, which is a continuation-in-part (Continued)

(51) Int. Cl.
*E05B 73/00* (2006.01)

(52) U.S. Cl.
CPC ................................ *E05B 73/0082* (2013.01)

(58) Field of Classification Search
CPC .. E05B 73/00; E05B 73/0017; E05B 73/0047; E05B 73/0082; A47F 7/0246;

(Continued)

(56) References Cited

U.S. PATENT DOCUMENTS 3,633,151 A * 1/1972 Sensabaugh ........... H01R 13/22 439/333
4,066,231 A * 1/1978 Bahner .................. F16M 13/00 70/229

(Continued)

OTHER PUBLICATIONS

Mobile Tech, Inc. (MTI), Freedom Axis [Product Manual].

(Continued)

*Primary Examiner* — Eret C McNichols
*Assistant Examiner* — Michael McDuffie
(74) *Attorney, Agent, or Firm* — Andriy Lytvyn; Hill Ward Henderson, P.A.

(57) ABSTRACT

An anti-theft device for securing an article of merchandise against unauthorized removal from a display counter. The anti-theft device comprises a latch plate and a pedestal having a quick-release interface. The latch plate is configured to selectively couple to the quick-release interface. A latch bolt is disposed within the pedestal. The latch bolt locks the latch plate relative to the quick-release interface. A plurality of retaining arms is configured to receive and retain an article of merchandise. The retaining arms cannot be disengaged from the article of merchandise while the latch plate is locked relative to the quick-release interface. A solenoid is housed within the pedestal and operationally connected to the latch bolt. The solenoid is configured to retract the latch bolt into a position in which the latch bolt disengages the latch plate, thereby releasing the latch plate from the quick-release interface.

27 Claims, 22 Drawing Sheets

Related U.S. Application Data of application No. 17/370,442, filed on Jul. 8, 2021, now Pat. No. 11,319,731.

(60) Provisional application No. 63/050,482, filed on Jul. 10, 2020.

(58) Field of Classification Search
CPC .... A47F 7/024; F16M 11/041; F16M 13/022; F16M 2200/02
USPC .............. 248/551, 552, 553, 220.21, 220.22, 248/221.11, 222.13, 223.41, 225.11
See application file for complete search history.

(56) References Cited

U.S. PATENT DOCUMENTS

| | | | | | |
|---|---|---|---|---|---|
| 4,458,872 | A * | 7/1984 | Couch | A47G 1/162 | 248/222.13 |
| 5,332,183 | A * | 7/1994 | Kagayama | B62J 6/03 | 248/223.41 |
| 5,555,302 | A * | 9/1996 | Wang | B60R 11/0241 | 379/426 |
| 5,903,645 | A * | 5/1999 | Tsay | B60R 11/0241 | 248/316.4 |
| 6,082,688 | A * | 7/2000 | Wilson | A01K 97/10 | 248/538 |
| 6,811,348 | B1 * | 11/2004 | Meyer | A42B 3/04 | 403/324 |
| 8,413,943 | B1 * | 4/2013 | Li | F16M 11/041 | 248/292.12 |
| 8,490,937 | B2 * | 7/2013 | Crain | F16M 11/041 | 248/316.4 |
| 8,596,595 | B2 * | 12/2013 | DeVito | F16M 11/041 | 211/57.1 |
| 8,711,553 | B2 * | 4/2014 | Trinh | E05B 73/0082 | 361/679.02 |
| 8,814,128 | B2 * | 8/2014 | Trinh | F16M 13/00 | 340/568.2 |
| 9,194,532 | B2 * | 11/2015 | Bisesti | A47F 7/024 | |
| 9,353,552 | B1 * | 5/2016 | Kelsch | A47F 5/00 | |
| 10,165,873 | B2 * | 1/2019 | Gulick, Jr. | A47F 7/0246 | |
| 10,322,764 | B2 * | 6/2019 | Thomas | B62J 9/21 | |
| 11,015,626 | B2 * | 5/2021 | Leyden | E05B 73/0082 | |
| 11,319,731 | B1 * | 5/2022 | Kelsch | E05B 73/0082 | |
| 11,737,582 | B2 | 8/2023 | Johnston et al. | | |
| 2011/0068920 | A1 | 3/2011 | Yeager et al. | | |
| 2012/0037783 | A1 * | 2/2012 | Alexander | A47F 7/024 | 248/551 |
| 2012/0126075 | A1 * | 5/2012 | Chinn | A61G 1/04 | 248/221.11 |
| 2012/0192600 | A1 * | 8/2012 | Johnston | A47F 7/024 | 70/58 |
| 2015/0305518 | A1 * | 10/2015 | Galant | A47F 7/0246 | 29/525.08 |
| 2016/0201359 | A1 * | 7/2016 | Berglund | G08B 13/1472 | 70/58 |
| 2021/0270410 | A1 * | 9/2021 | Horvath | F16M 13/02 | |

OTHER PUBLICATIONS

Vanguard Protex Global, Kindle with G5 Below The Counter Solution [Promotional Sheets].
Vanguard Protex Global, Tablet Quick Disconnect Bracket [Specification Sheet].

* cited by examiner

SECURITY DEVICE WITH A REMOTELY ACTUATED QUICK-RELEASE MECHANISM

PRIORITY CLAIM

This non-provisional application is a continuation-in-part of and claims priority to U.S. non-provisional patent application Ser. No. 17/730,873 filed on Apr. 27, 2022, which is a continuation-in-part of and claims priority to U.S. non-provisional patent application Ser. No. 17/370,442 filed on Jul. 8, 2021, which claims priority to U.S. provisional application No. 63/050,482 filed on Jul. 10, 2020.

BACKGROUND OF THE INVENTION

1. Field of the Invention

This invention relates to merchandise anti-theft devices. More specifically, it relates to an anti-theft device having a quick-release mechanism for securing and removing an article of merchandise from a pedestal.

2. Brief Description of the Related Art

Retailers often prefer to present their merchandise to consumers in a way that allows the consumers to touch, inspect, and otherwise interact with the products at a display counter. Many merchandise items, especially portable electronic devices, are relatively expensive and, therefore, are under a serious threat of theft. Retailers often face a dilemma of balancing a need to interactively display their merchandise to attract customers and increase sales, with a need to safeguard the merchandise against theft.

One type of anti-theft device for securing articles of merchandise involves a bracket having retention arms that secure an article of merchandise by grasping the opposite edges thereof. An example of such device is disclosed in U.S. Pat. No. 10,378,268, entitled "Anti-Theft Device with Adjustable Locking Arms for Securing an Article of Merchandise." In this type of a security device, the bracket is positioned behind the article of merchandise, thus enabling customers to have full, unobstructed access to the front face—i.e., the screen—of the article of merchandise. However, to safeguard the article of merchandise against unauthorized removal from the retail store, the bracket must be securely connected to a display counter.

In certain circumstances, the retail stores have a need to quickly disconnect the bracket portion of the anti-theft device from the display counter, so that the bracket—and the article of merchandise secured therein—can be easily released and handed to the customer for a closer hands-on interaction or can be securely stored away in a safe when the retail store is closed, such as at night. It is also desirable that the bracket can be quickly and efficiently reconnected by locking it to an interface of the security device anchored to the retail display counter.

Thus, what is needed is an anti-theft device that enables store personnel to quickly and efficiently disconnect and, subsequently, reconnect a bracket of the anti-theft device retaining the article of merchandise to the interface of the anti-theft device anchored to the retail display counter or affixed to a pedestal.

SUMMARY OF THE INVENTION

The need for a retail security device having a quick connect and disconnect functionality is now met by a novel and non-obvious invention. In an embodiment, the invention pertains to an anti-theft device that involves a pedestal and a securing bracket having adjustable lockable arms to retain the merchandise therein. A latch plate attaches to the underside of the securing bracket. The latch plate has one or more rails disposed on the bottom surface thereof. The pedestal includes a quick-release interface configured to couple to the latch plate.

In an embodiment, the quick-release interface has one or more longitudinal channels. At least one longitudinal channel is configured to receive a corresponding rail of the latch plate. The longitudinal channel has a top opening and a lateral opening. A flange partially occludes the top opening, thereby preventing the rail from exiting the longitudinal channel via the top opening, thus precluding the latch plate from being lifted from the quick-release interface.

A latch is disposed within the pedestal and has a first position in which the latch is configured to engage a protrusion on the underside of latch plate, and a second position in which the latch disengages the latch plate. When the latch is in its first position, the latch immobilizes the latch plate against lateral movement with respect to the quick-release interface. In this manner, the latch plate remains securely coupled to the quick-release interface. In the second position, the latch disengages the latch plate, thereby enabling the rail to slide within the longitudinal channel of the quick-release interface. Thus, when the latch is in the second position, the rail can exit the longitudinal channel via the lateral opening, thereby releasing the latch plate from the quick-release interface.

In an embodiment, a solenoid is disposed within the pedestal and is operatively connected to the latch. The latch may be biased toward its first position. When the solenoid is energized, the solenoid retracts the latch into its second position away from the latch plate, thus releasing the latch plate from the quick-release interface.

In an embodiment, the latch is a latch bolt configured to engage a protrusion on the underside of the latch plate. To couple the latch plate to the quick-release interface, the rail and the protrusion of the latch plate are inserted into the corresponding longitudinal channels of the quick-release interface. The latch plate is then advanced relative to the quick-release interface. The protrusion engages the sloped surface of the latch bolt, and continued advancement of the protrusion displaces the latch bolt into its second position against the biasing force of the spring. When a receptacle within the latch bolt becomes aligned with the protrusion of the latch plate, the biasing force of the spring returns the latch bolt to the first position in which the receptacle of latch bolt receives the protrusion of the latch plate therein, thereby immobilizing the protrusion against lateral retraction relative to the longitudinal channel of the quick-release interface in which the protrusion resides. The solenoid may be actuated using a wireless remote control device. Upon actuation, the solenoid retracts the latch bolt away from the protrusion of the latch plate, thereby enabling the latch plate to slide laterally relative to the quick-release interface, such that the rail of the latch plate can exit the longitudinal channel of the quick-release interface via its lateral opening.

In an embodiment, the securing bracket is configured to couple to the article of merchandise via a screw. The screw is inaccessible when the latch plate is coupled to the quick-release interface. In this embodiment, the securing bracket has a securing plate with an angled leaflet configured to restrict the article of merchandise against rotation about a longitudinal axis of the screw. The securing plate may be configured to be affixed to the bracket via fasteners, which are inaccessible when the securing bracket is coupled to the article of merchandise.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced.

It is to be understood that other embodiments may be utilized and structural changes may be made without departing from the scope of the invention.

Figure 1:
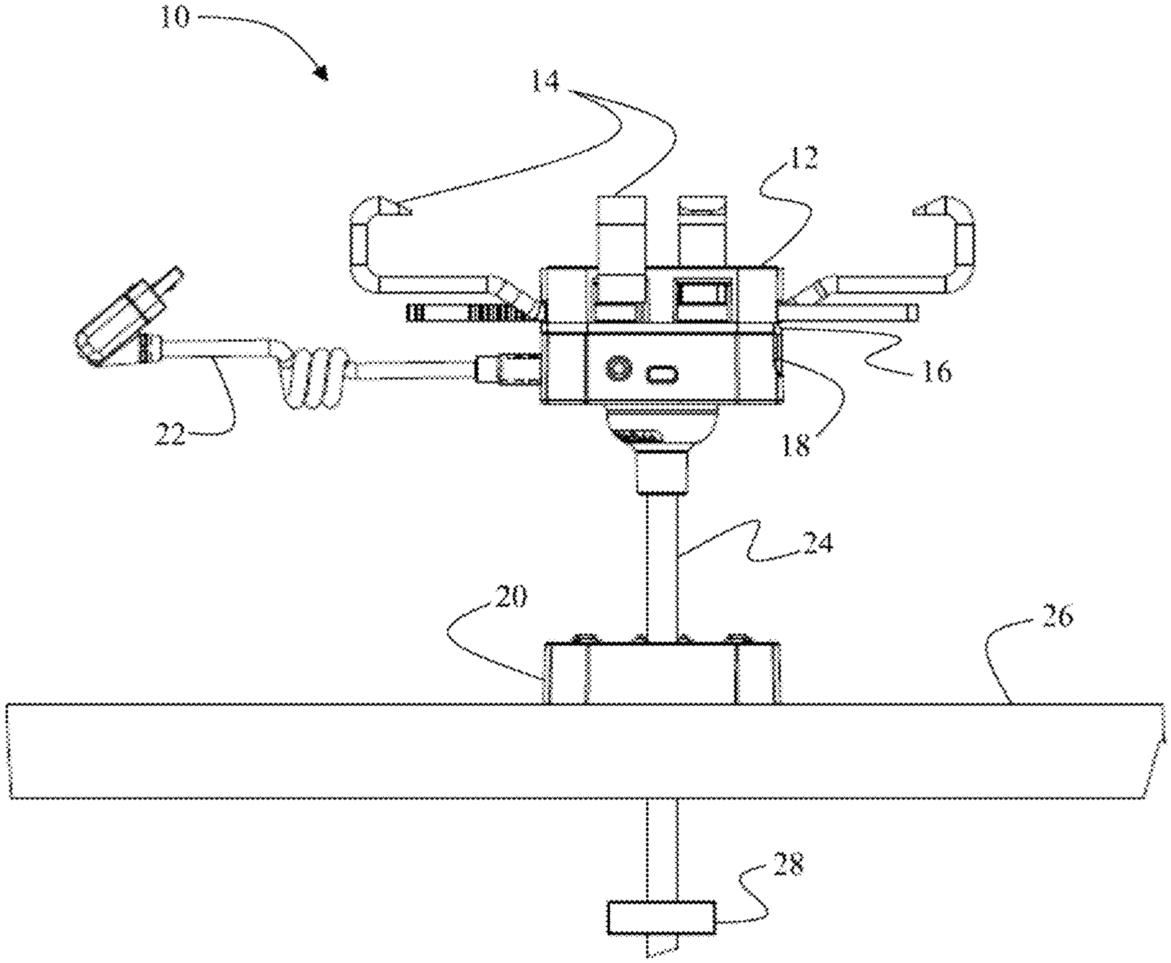
FIG. 1 is a side view depicting the anti-theft device.

FIG. 1 depicts a side view of security device 10. Security device 10 comprises a securing bracket 12 having a plurality of adjustable retaining arms 14 configured to receive and secure an article of merchandise. To secure merchandise—such as a smartphone—the merchandise is placed into bracket 12, and retention arms 14 are partially retracted into the housing of bracket 12 so that the C-shaped grips disposed on the terminal ends of arms 14 grasp edges/corners of the merchandise. After the merchandise is secured within bracket 12, a locking mechanism is engaged to immobilize retaining arms 14. An embodiment of securing bracket 12 is disclosed in more detail in U.S. Pat. No. 10,378,268.

Figure 3A:
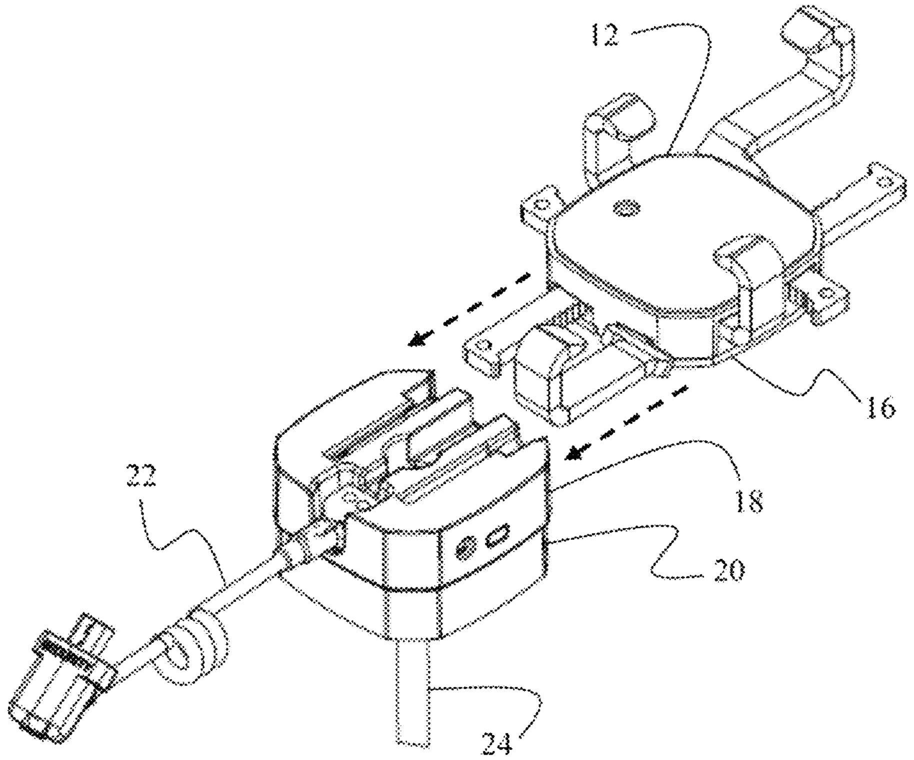
FIG. 3A is a perspective top view depicting the interaction between the quick-release interface and the latch plate, with the power cable coupled to a power port of the quick-release interface.
Figure 3B:
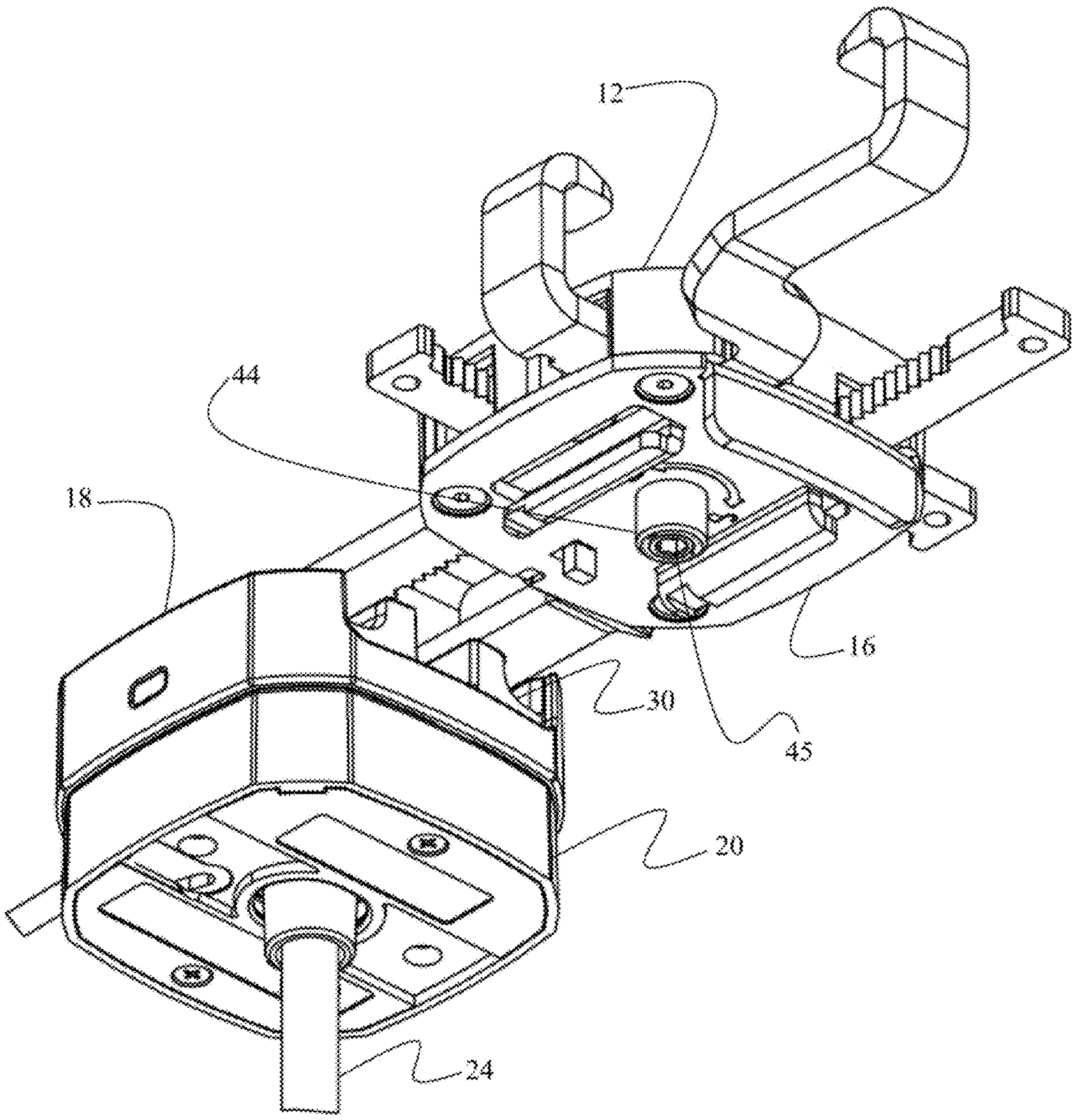
FIG. 3B is a perspective bottom view depicting the interaction between the quick-release interface and the latch plate.

FIG. 1 further depicts a latch plate 16 attached to the underside of securing bracket 12. FIG. 1 further depicts a quick-release interface 18 coupled to latch plate 16. In this manner, latch plate 16 is sandwiched between securing bracket 12 and quick-release interface 18. Latch plate 16 and quick-release interface 18 are depicted in more detail in FIGS. 4 and 5, respectively. The manner in which latch plate 16 is configured to couple to quick-release interface 18 is depicted in FIGS. 3A-3B.

Continuing reference to FIG. 1, a pedestal 20 is mounted onto a display counter 26. The top surface of pedestal 20 is configured to mate with the underside surface of quick-release interface 18. In this manner, quick-release interface 18 is configured to removably rest on pedestal 20.

In an embodiment, pedestal 20 has a plurality of electrical contacts, which are electrically connected to a power supply. The underside of quick-release interface 18 also has electrical contacts. When quick release interface 18 is at rest on pedestal 20, the electrical contacts of quick-release interface 18 engage the electrical contracts of pedestal 20, thereby enabling electrical power to be delivered from pedestal 20 to quick-release interface 18. Quick-release interface 18 may further comprise a power cable 22. A terminal end of power cable 22 has a connector configured to couple to a power port of the merchandise. In this manner, when quick-release interface 18 is at rest on pedestal 20, electrical power can be delivered from pedestal 20 to the merchandise secured within bracket 12. In this manner, a battery of the merchandise can be recharged when quick-release interface 18 is at rest on pedestal 20.

Continuing reference to FIG. 1, security device 10 may further include a tether 24, which secures quick-release interface 18 against unauthorized removal from a display counter 26. Tether 24 has a first end connected to quick-release interface 18 and a second end residing underneath a display counter 26. In this embodiment, pedestal 20 and display counter 26 have aligned apertures through which tether 24 passes. An anchor 28 is affixed to the second end of tether 24, underneath display counter 26. Anchor 28 is larger than the aperture within display counter 26, and therefore, anchor 28 prevents tether 24 from being fully withdrawn through the aperture. In this manner, tether 24 connects and secures quick-release interface 18 to display counter 20. Tether 24 can be flexible (e.g., a cable) or rigid (e.g., a rod). Alternatively, instead of using a fixed-length tether 24 with anchor 28, tether 24 can be a retractable cable wrapped on a spinning reel.

Because securing bracket 12 is coupled to quick-release interface 18 via latch plate 16, the length of tether 24 dictates the maximum distance by which merchandise can be lifted from pedestal 20. Accordingly, a customer can lift the merchandise off pedestal 20 for a closer interaction but cannot steal the merchandise because the merchandise is secured to display counter 26 by tether 24. In an embodiment, tether 24 can be made of a strong metal or a metal alloy, for example, steel. In an alternative embodiment, quick release interface 18 can be mounted directly to pedestal 20 or display counter 26, foregoing tether 24. In such embodiment, merchandise is displayed stationarily and cannot be lifted for a closer interaction.

Figure 2:
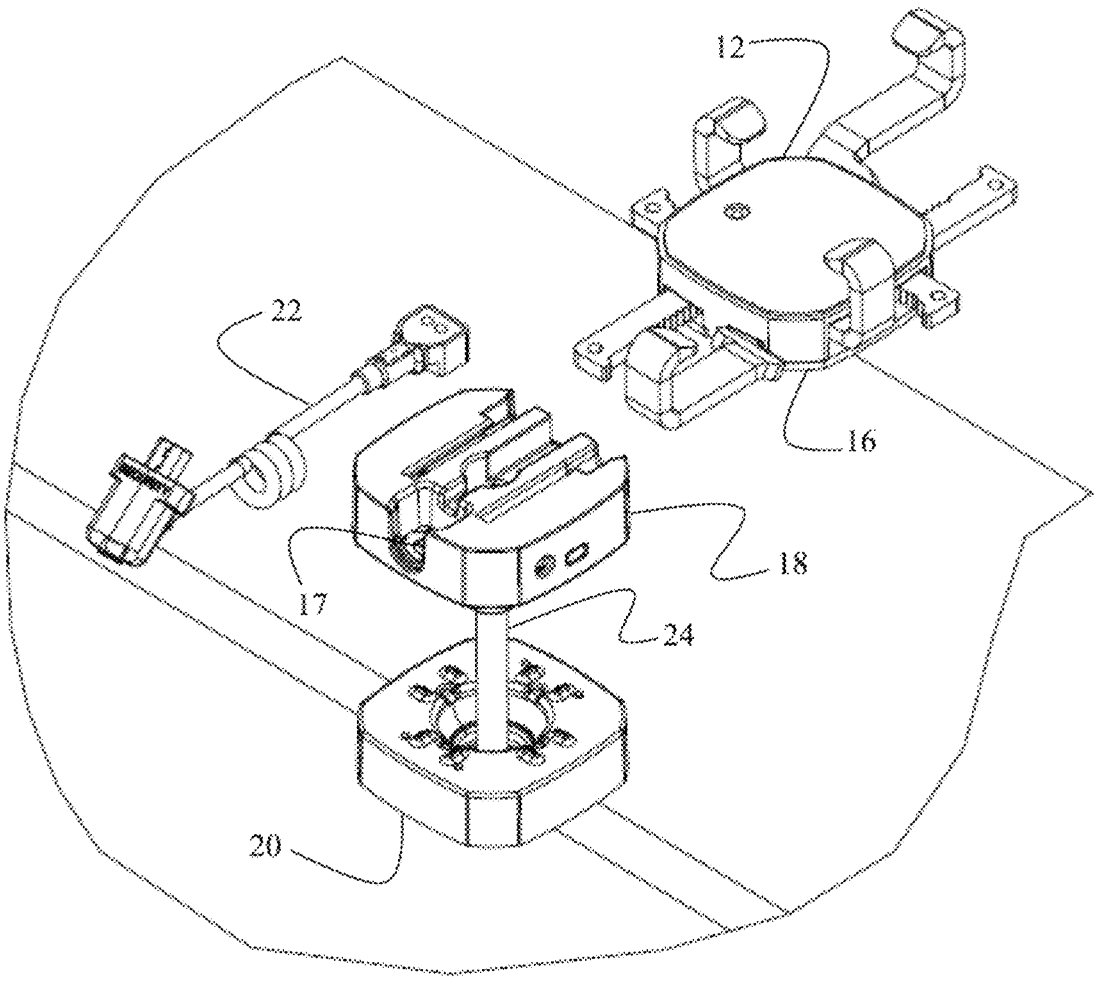
FIG. 2 is a perspective view of the anti-theft device in a decoupled configuration, with a power cable detached.

FIG. 2 depicts security device 10, with latch plate 16 decoupled from quick-release interface 18. FIG. 2 depicts that, when latch plate 16 is decoupled from quick-release interface 18, power cable 22 can be disconnected from quick-release interface 18. This feature enables store personnel to interchange power cables 22 having various connectors to accommodate the power port of merchandise being secured. Quick-release interface 18 has a recess configured to receive power cable 22. When latch plate 16 is coupled to quick-release interface 18, latch plate 16 covers the recess, thereby preventing power cable 22 from being disconnected from the quick-release interface 18 without first decoupling latch plate 16 from quick-release interface 18.

FIGS. 3A and 3B depict that securing bracket 12 is configured to couple to quick-release interface 18 by sliding rails 38 of latch plate 16 into channels 30 disposed within quick-release interface 18. As will described in more detail below, with reference to FIGS. 4-6, latch plate 16 and quick-release interface 18 have structural features that enable them to quickly and securely mate with one another. A locking mechanism is disposed within quick-release interface 18. In the coupled configuration, the locking mechanism is configured to immobilize latch plate 16 relative to quick-release interface 18. Because quick-release interface 18 is anchored to display counter 26 with tether 24, latch plate 16 and bracket 12 are secured against unauthorized removal from display counter 26. As was explained above, tether 24 allows bracket 12 (and the merchandise secured therein) to be lifted from pedestal 20 by a distance dictated by the length of tether 24. To release bracket 12 from the restraint of tether 24, latch plate 16 must be disconnected from quick-release interface 18.

Figure 4:
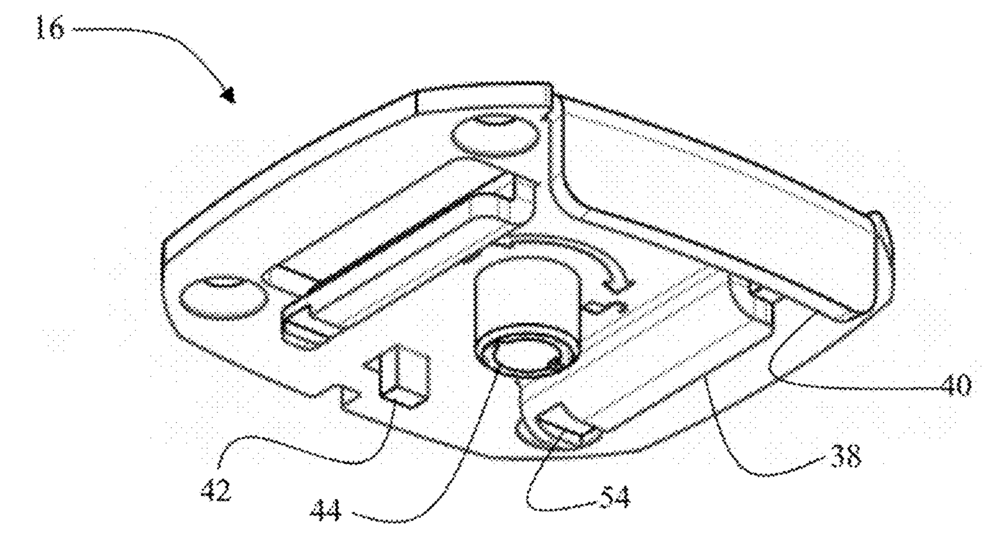
FIG. 4 is a perspective bottom view depicting the latch plate.
Figure 5:
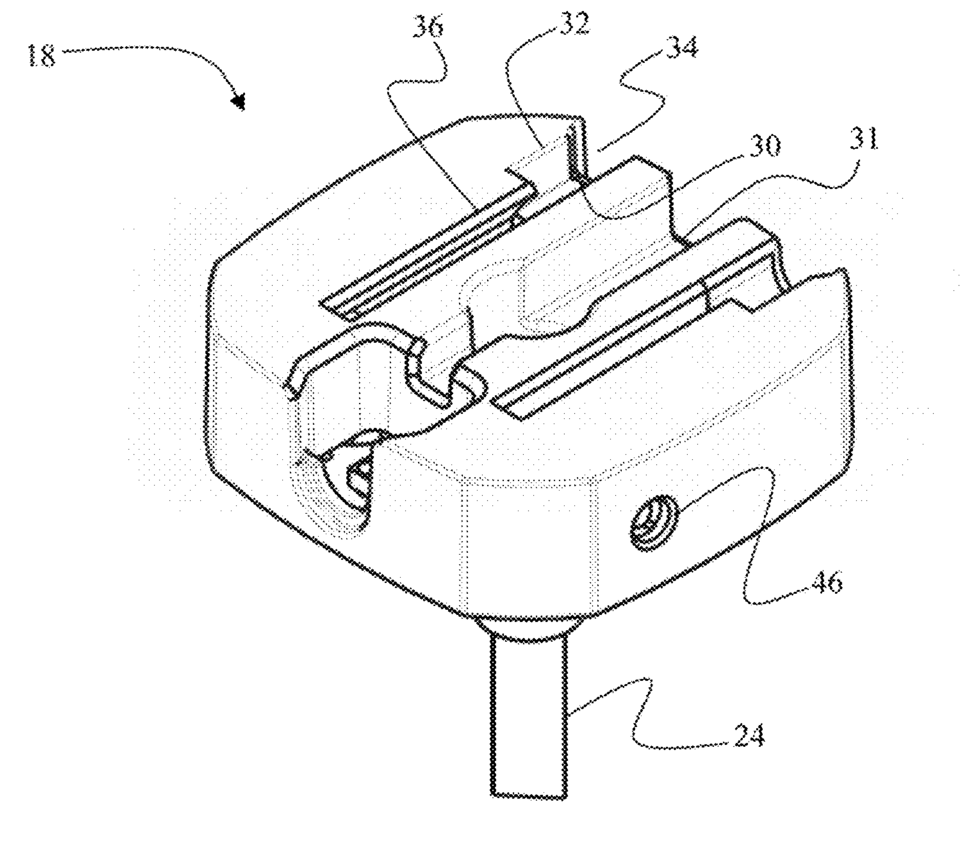
FIG. 5 is a perspective view of the quick-release interface.
Figure 6:
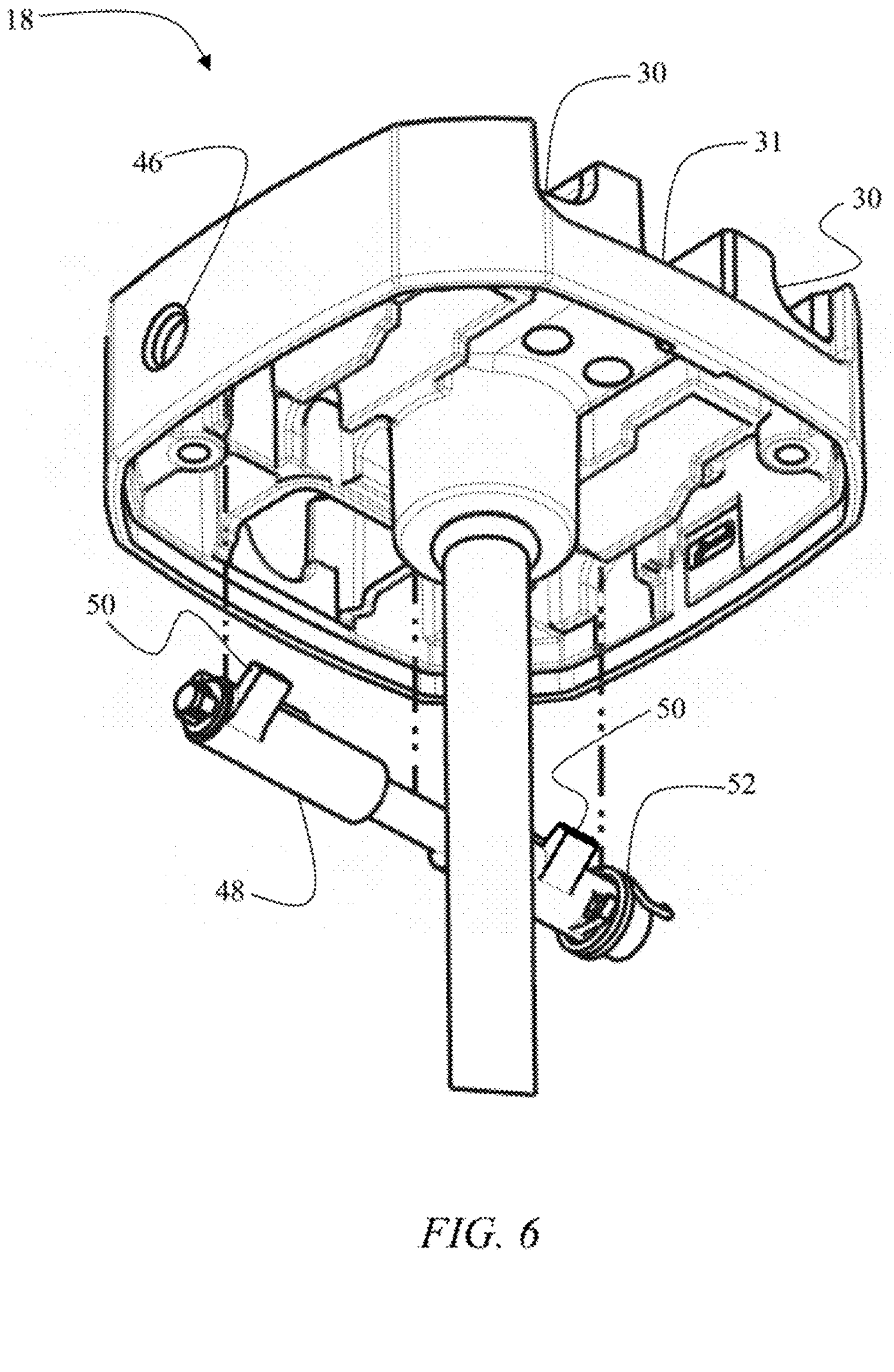
FIG. 6 is an exploded view of the quick-release interface depicting the torsion latch.

FIGS. 4-6 depict the structural features of quick-release interface 18 and latch plate 16 that enable them to interlock with one another. Specifically, FIG. 5 depicts that quick-release interface 18 has two longitudinal channels 30. Each channel 30 has a top opening 32 on the top surface of quick-release interface 18 and a lateral opening 34 on the lateral side of quick-release interface 18. Each channel 30 also has a flange 36 partially occluding top opening 32 of the channel at the top surface of quick-release interface 18. Additionally, quick-release interface 18 has a central channel 31 configured to accommodate a port 44 which protrudes from the underside of latch plate 16.

FIG. 4 depicts latch plate 16 having two elongated rails 38. Rails 38 are configured to enter channels 30 through lateral openings 34. FIG. 4 further depicts that each rail 38 has a lip. When rails 38 are positioned within channels 30, flanges 36 engage the lips of rails 38, thereby preventing rails 38 from exiting channels 30 via top openings 32. In this manner, flanges 36 immobilize latch plate 16 against being lifted off quick-release interface 18. Thus, the only way to detach latch plate 16 from quick-release interface 18 is by sliding latch plate 16 relative to quick-release interface 18 so that rails 38 can exit channels 30 via lateral openings 34.

FIG. 4 further depicts that, latch plate 16 may have a front cover 40 configured to occlude lateral openings 34 of channels 30 when latch plate 16 is coupled to quick-release interface 18. In this manner, front cover 40 ensures that channels 30 cannot be accessed when latch plate 16 is coupled to quick interface 18. FIG. 4 also depicts that latch plate 16 may include a protrusion 42 configured to immobilize power cable 22 against removal from the recess of quick-release interface 18.

Finally, FIG. 4 depicts that latch cover 16 has port 44 providing access to the locking mechanism 45 (shown in FIG. 3B) of securing bracket 12. When latch plate 16 is coupled to quick-release interface 18, port 44 is concealed, and, therefore, securing bracket 12 cannot be unlocked. To access the locking mechanism of securing bracket 12, latch plate 16 must be decoupled from quick-release interface 18.

FIG. 5 depicts that quick-release interface 16 has an access port 46. As depicted in FIG. 6, access port 46 provides access to a torsion latch 48 rotationally disposed within quick-release interface 18. Torsion latch 48 has one or more teeth 50. Torsion latch 48 has a first position in which teeth 50 protrude into channels 30 of quick-release interface 18. Torsion latch 48 can be rotated about its central axis into a second position, in which teeth 50 are retracted away from channels 30.

Torsion latch 48 is structured such that the angular range of its rotation is restricted so that torsion latch 48 can only rotate between the first and second positions. Quick-release interface 18 further comprises a torsion spring 52 configured to bias torsion latch 48 toward the first position in which teeth 50 protrude into the channels 30.

FIG. 5 depicts that rails 38 of latch plate 16 have notches 54. Notches 54 are configured to receive teeth 50 of torsion latch 48 when torsion latch 48 is in its first position. When teeth 50 enter notches 54, they immobilize rails 38 against longitudinal movement within channels 30. Accordingly, when torsion latch 48 is in its first position and latch plate 16 is coupled to quick-release interface 18, torsion latch 48 immobilizes latch plate 16 relative to quick-release interface 18.

Latch plate 16 is configured to be locked to quick-release interface 18 in the manner depicted in FIGS. 3A-3B. First, latch plate 16 is positioned at the lateral side of quick-release interface 18 so that rails 38 align with lateral openings 34 of channels 30. Next, the user slides latch plate 16 laterally relative to quick-release interface 18, such that the rails 38 of latch plate 16 slide into channels 30 of quick-release interface 18. As rails 38 continue to slide within channels 30, proximal ends of rails 38 engage teeth 50 of torsion latch 48 causing torsion latch 48 to rotate in the counterclockwise direction, against the biasing force of torsion spring 52. In this manner, torsion latch 48 rotates into its second position in which teeth 50 are retracted away from channels 30, thereby permitting rails 38 to slide past torsion latch 48.

When rails 38 are fully inserted into channels 30, notches 54 become aligned with teeth 50. At this point, the biasing force of torsion spring 52 causes torsion latch 48 to rotate in the clockwise direction, back into its first position. In this first position, teeth 50 of the torsion latch 48 enter notches 52 of rails 38, immobilizing rails 38 against longitudinal movement within channels 30. In this manner, latch plate 16 is securely coupled to quick-release interface 18.

To release latch plate 16 from quick-release interface 18, torsion latch 48 must be rotated into its second position, in which teeth 50 exit notches 54. This can be accomplished by rotating torsion latch 48 in the counterclockwise direction, against the biasing force of torsion spring 52. To accomplish this, a specific tool (not shown) may be inserted into access port 46 of quick-release interface 18. The tool can be configured to engage torsion latch 48 and rotate it into the second position. When torsion latch 48 is rotated into its second position, teeth 50 exit notches 54, thereby releasing latch plate 16. Thus, to release latch plate 16 from quick-release interface 18, the tool must be used to rotate torsion latch 48 into its second position. While using the tool to maintain torsion latch 48 in its second position, the user applies a force onto latch plate 16 to slide latch plate 16 relative to quick-release interface 18 in the direction of channels 30. At this point, rails 38 can exit channels 30 via their lateral openings 34, thus releasing latch plate 16 from quick-release interface 18.

It shall be noted that the direction of rotation in the embodiment described above is merely exemplary. It will be appreciated that latch plate 16 and quick-release interface 18 can be structured so that torsion latch 48 rotates in counterclockwise direction when tooth 50 is displaced by rails 38 and, then, springs back in the clockwise direction when notches 54 are positioned over teeth 50. Such structural differences are merely a design choice and fall within the scope of the subject matter of the invention.

As should be evident from the description provided above, when latch plate 16 is coupled to quick-release interface 18, security device 10 provides multiple layers of security. First, port 44 through the which the locking mechanism of securing bracket 12 can be accessed is concealed. Thus, the merchandise cannot be released from retaining arms 14 while securing bracket 12 is coupled to quick-release interface 18 via latch plate 16. Second, tether 24 anchors quick-release interface 18 to display counter 26 and, therefore, prevents removal of merchandise from display counter 26. Third, only a specific tool (key) can be used to disengage torsion latch 48 from rails 38. Thus, without being in possession of this specific tool, a thief would not be able to decouple latch plate 16 from quick-release interface 18. Fourth, power cable 22 cannot be removed from quick-release interface 18 while quick-release interface 18 and latch plate 16 are coupled together.

FIGS. 7A-9E depict another embodiment of the invention. In this embodiment, quick-release interface 18 is affixed to a pedestal 90, rather than being removably connected thereto via tether 24. In the following description of this embodiment reference is made to FIGS. 8A and 8B, which depict pedestal 90 without the exterior housing to show the components housed within pedestal 90 and the mechanism for locking and unlocking latch plate 16.

Analogously to the embodiment depicted in FIGS. 1-6, the embodiment depicted in FIGS. 7A-9E utilizes latch plate 16 with the same general structure, including rails 38 configured to slidingly reside within channels 30 of quick-release interface 18. As described above, channels 30 of the quick-release interface 18 have flanges 36 configured to engage the lips of rails 38, thereby preventing rails 38 from exiting channels 30 via top openings 32. Thus, latch plate 16 can be removed from quick-release interface 18 only by linearly retracting latch plate 16 relative to quick-release interface 18 until rails 38 exit channels 30 via lateral openings 34.

In addition to rails 38, the underside of latch plate 16 contains a protruding port 44 configured to slide within channel 31 of quick release interface 18. In the embodiment depicted in FIGS. 7A-9E, channel 31 has a central opening on the underside of the quick-release interface 18 configured to align with port 44 of latch plate 16 when latch plate 16 is in its fully advanced position relative to quick-release interface 18.

Figure 8A:
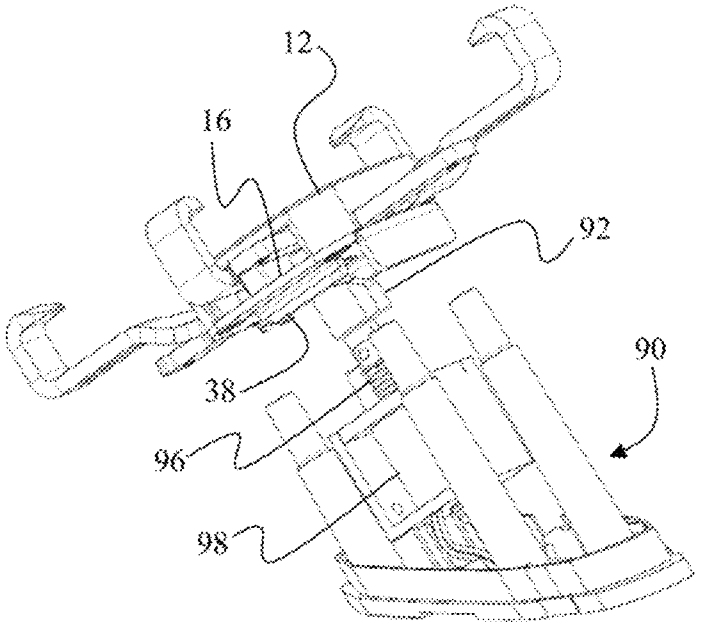
FIG. 8A is perspective view of the embodiment depicted in FIGS. 7A and 7B, with the cover of the pedestal removed, showing a latch bolt in its default extended position, in which the latch bolt engages a protruding port of the latch plate.
Figure 8B:
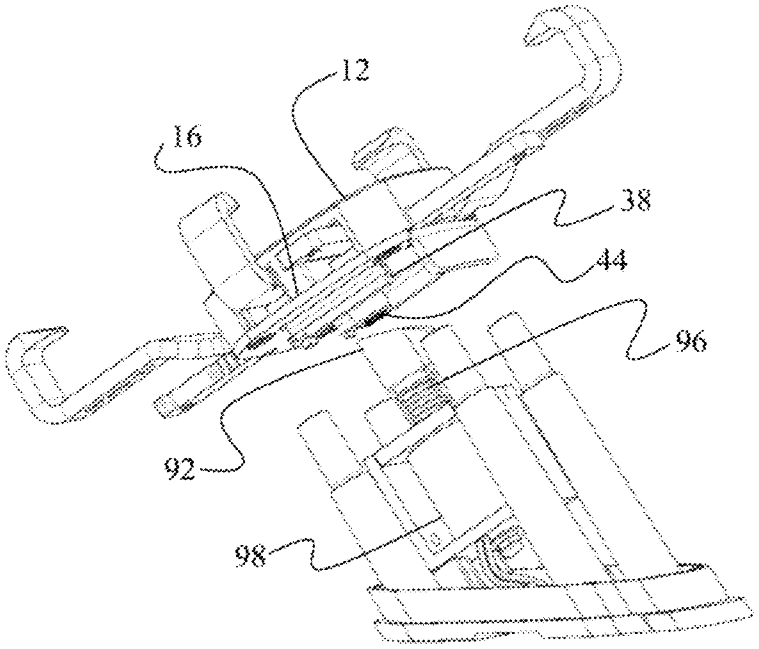
FIG. 8B is perspective view of the embodiment depicted in FIGS. 7A and 7B, with the cover of the pedestal removed, showing the latch bolt in its retracted position, in which the latch bolt is disengaged from the protruding port of the latch plate.

FIGS. 8A and 8B depict that pedestal 90 houses a latch bolt 92 configured to enter channel 30 through opening in the underside of latch plate 16 to selectively engage port 44 of latch plate 16. FIG. 8A depicts an extended position of latch bolt 92, in which latch bolt 92 extends into channel 31, thus blocking the path of travel of port 44 through channel 31 and thereby preventing latch plate 16 from retracting relative to quick-release interface 18. Because latch plate 16 cannot be removed from quick-release interface 18 until rails 38 exit channels 30 via lateral openings 34, the engagement between latch bolt 92 and port 44 (which restrains latch plate 16 against retracting from quick-release interface 18) secures latch plate 16 to quick-release interface 18.

Figure 7A:
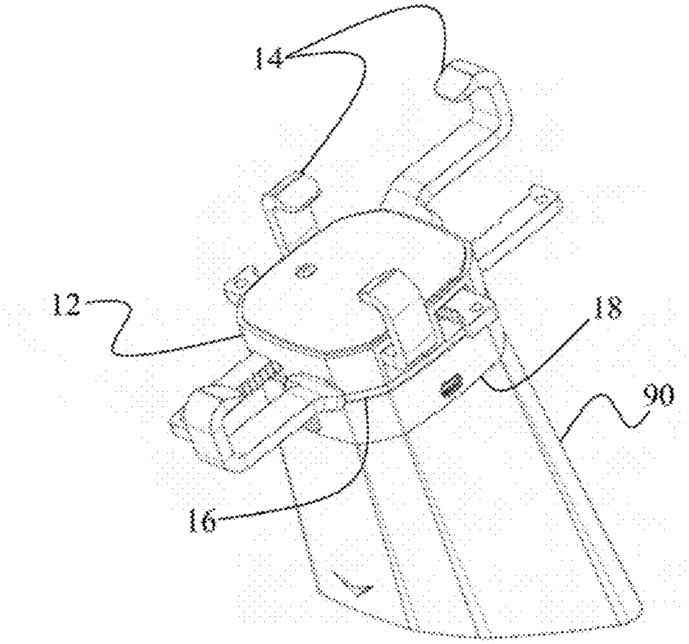
FIG. 7A is perspective view of an embodiment in which the quick-release interface is affixed to the pedestal, showing the latch plate and the securing bracket coupled to the quick-release interface.
Figure 7B:
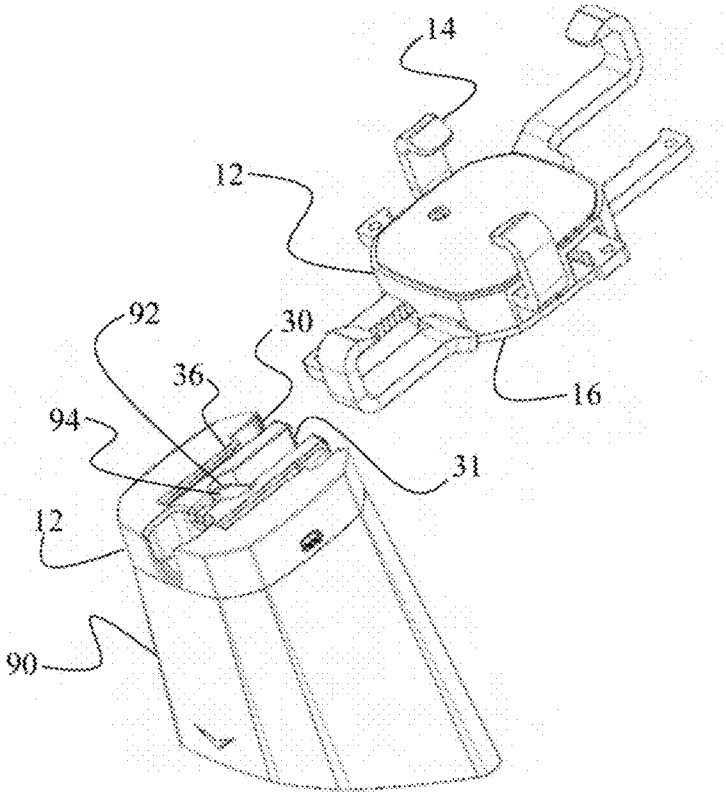
FIG. 7B is perspective view of the embodiment in which the quick-release interface is affixed to the pedestal, showing the latch plate and the securing bracket removed from the quick-release interface and the pedestal.

To remove latch plate 16 from quick-release interface 18, latch bolt 92 must be retracted away from port 44, thereby enabling latch plate 16 to slidingly retract relative to quick-release interface 18, such that rails 38 can exit channels 30 via lateral openings 34. FIG. 9B depicts a retracted position of latch bolt 92 in which latch bolt 92 exits channel 31, thereby clearing the path of travel for port 44 to slidingly retract within channel 31, thereby enabling removal of latch plate 16 from quick-release interface 18, as depicted in FIG. 7B.

FIGS. 8A and 8B further depict that latch bolt 92 may comprise a receptacle 94 for receiving port 44. The size and shape of receptacle 94 may be complementary to the size and shape of port 44 thereby facilitating a close fit therebetween to prevent relative movement thereof.

FIGS. 8A and 8B depict a biasing element 96 operationally coupled to latch bolt 92. The biasing element depicted in FIGS. 8A and 8B is a helical spring, but other biasing elements including elastomeric polymers, non-helical springs, and magnets also fall within the scope of the invention. Biasing element 96 urges latch bolt 92 toward its default extended position depicted in FIG. 8A. An electromechanical actuator 98—for example, a solenoid (or another type of electromagnetic device), an electric motor, a pneumatic motor, etc.—is configured to retract latch bolt 92 against the force exerted thereon by biasing element 96. In the embodiment depicted in FIGS. 8A and 8B, solenoid 98 is configured to compress helical spring 96, thereby retracting latch bolt 92 out of channel 31 of quick-release interface 18 and away from port 44 of latch plate 16. With the latch bolt 92 in the retracted position, port 44 can slide out of channel 31, thereby enabling removal of latch plate 16 from quick-release interface 18.

In an embodiment, solenoid 98 may be actuated responsive to a sensor within pedestal 90 detecting a predefined signal transmitted from a designated remote control device. The signal may be an optical signal (for example, infrared (IR)), a radio frequency (RF) signal, an audible signal, a near field communication (NFC) transmission, or another type of signal known in the art suitable for this purpose. In retail environment, store personnel can use a designated remote control device configured to transmit the predefined signal to actuate solenoid 98. Upon being energized, solenoid 98 retracts latch bolt 92 away from port 44, thus enabling the store personnel member to manually slide latch plate 16 out of quick-release interface 18. In this manner, the merchandise can be removed from pedestal 90, handed to a customer for a hands-on supervised interaction, and then replaced back onto pedestal 90 upon conclusion of the interaction.

Figure 9A:
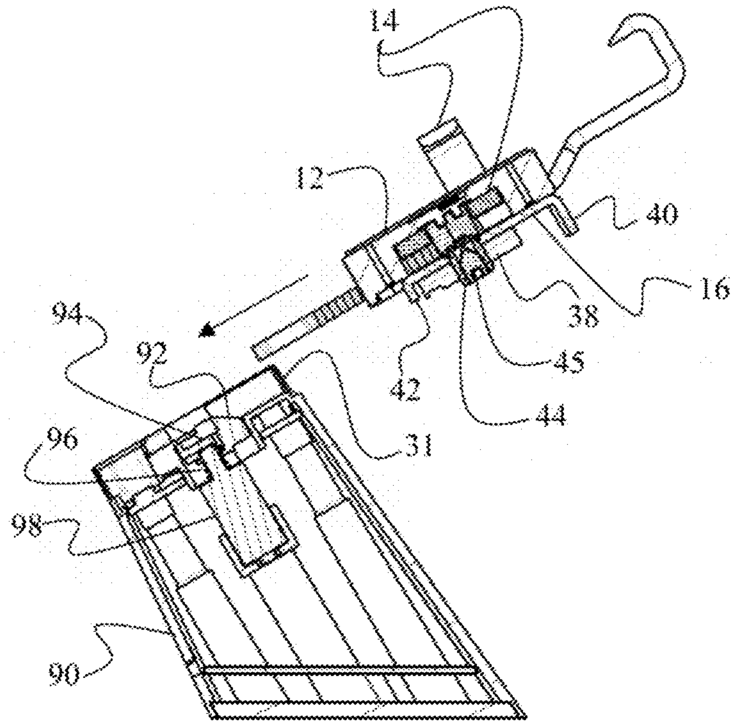
FIG. 9A is a first figure in a sequence depicting the method of coupling the latch plate and the securing bracket to the quick release interface, showing the latch plate detached from the quick-release interface.
Figure 9B:
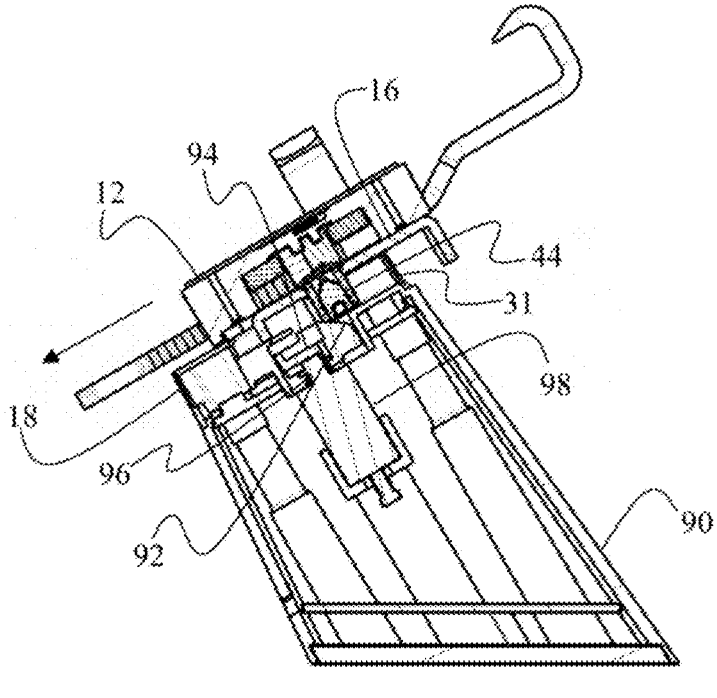
FIG. 9B is a second figure in a sequence depicting the method of coupling the latch plate and the securing bracket to the quick release interface, showing the latch plate inserted into the quick-release interface and the port of the latch plate displacing the latch bolt toward its retracted position against the biasing force of a spring.
Figure 9C:
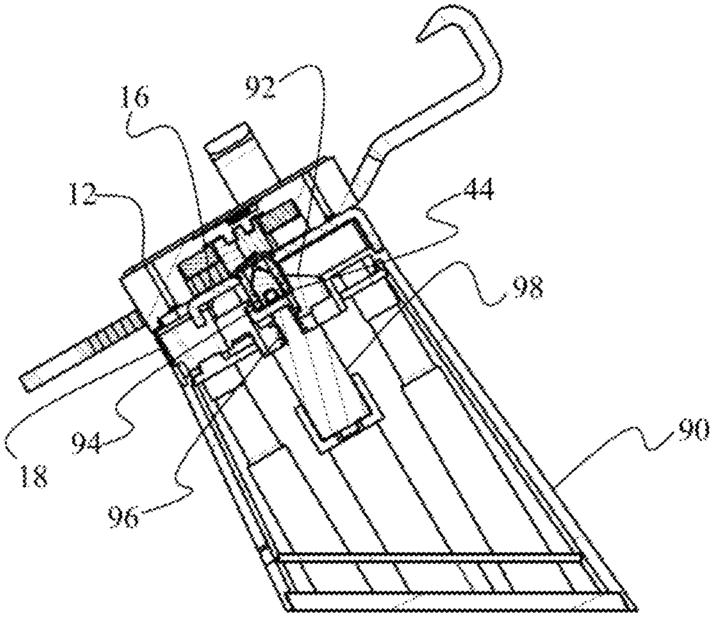
FIG. 9C is a third figure in a sequence depicting the method of coupling the latch plate and the securing bracket to the quick release interface, showing the latch plate in its fully inserted position relative to the quick-release interface with the latch bolt returned to its extended position in which the latch bolt engages the port.
Figure 9D:
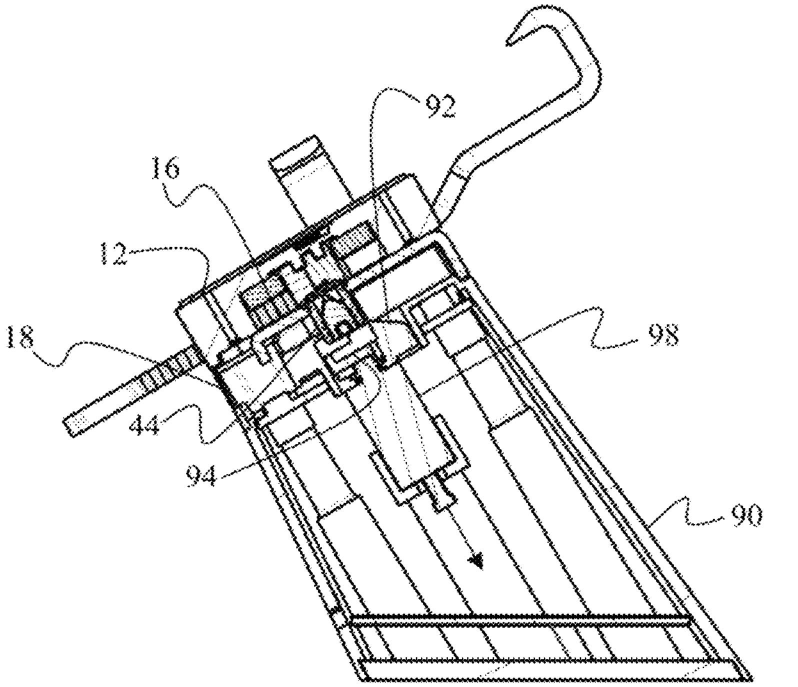
FIG. 9D is a first figure in a sequence depicting the method of removing the latch plate from the securing bracket to the quick release interface, showing the solenoid retracting the latch bolt away from the port on the underside of the latch plate, thus releasing the latch plate.
Figure 9E:
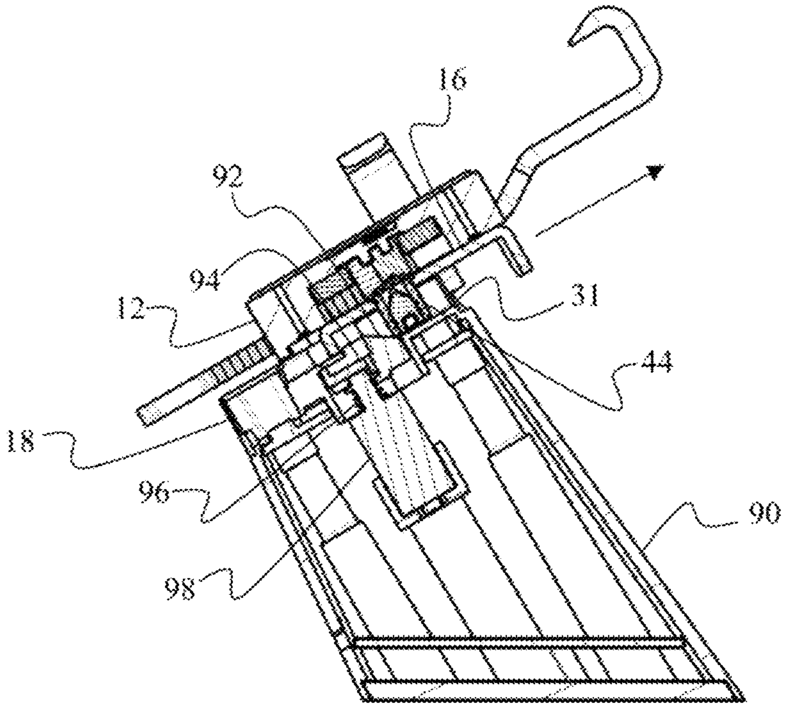
FIG. 9E is a second figure in a sequence depicting the method of removing the latch plate from the securing bracket to the quick release interface, showing the solenoid returned to its default extended position by the spring and the latch plate retracting out of the quick-release interface.

FIGS. 9A-9C depict a sequence of cross-sectional drawings illustrating the method of coupling latch plate 16 to quick-release interface 18, while FIGS. 9D and 9E depict the sequence of releasing latch plate 16 from quick-release interface 18 and removing securing bracket 12 from pedestal 90. FIG. 9A depicts that latch plate 16 is attached to securing bracket 12, and this assembly is aligned with quick-release interface 18, such that rails 38 are aligned with channels 30 and protruding port 44 is aligned with channel 31. Rails 38 are inserted underneath flanges 36 and latch plate 16 is slidingly advanced relative to quick-release interface 18 (the engagement between rails 38 and flanges 36 is most clearly depicted in FIG. 10).

FIG. 9B depicts that when port 44 encounters the sloped surface of latch bolt 92, continued advancement of port 44 progressively displaces latch bolt 92 toward its retracted position against the biasing force of biasing element 96. When port 44 aligns with receptacle 94 of latch bolt 92, biasing element 96 returns latch bolt 92 to its default extended position in which latch bolt 92 enters channel 31 and receptacle 94 receives port 44 therein. At this point, the latch bolt 92 immobilizes latch plate 16 against retraction relative to quick-release interface 18. Because the lips of rails 38 reside underneath flanges 36, latch plate 16 cannot be lifted from quick-release interface 18. In this locked configuration, which is depicted in FIGS. 9C and 10, latch plate 16 is coupled to quick-release interface 18 and cannot be removed therefrom while latch bolt 92 remains in the extended configuration, in which receptacle 94 engages port 44 and precludes port 44 from slidingly translating along channel 31.

FIG. 9D depicts that to remove securing bracket 12 from pedestal 90, a store personnel actuates solenoid 98 (or another type of electromagnetic device) to transition latch bolt 92 into its retracted position against the biasing force exerted thereon by biasing element 96. When latch bolt 92 is retracted away from port 44, port 44 is free to translate along channel 31. FIG. 9E depicts that after latch bolt 92 disengages port 44, latch plate 16 can be slidingly retracted relative to quick-release interface 16, thereby enabling rails 38 to exit channels 30 via their lateral openings 34, thus enabling store personnel to detach securing bracket 12 and the article of merchandise secured therein from pedestal 90 and present it to a customer for a hands-on interaction.

Figure 10:
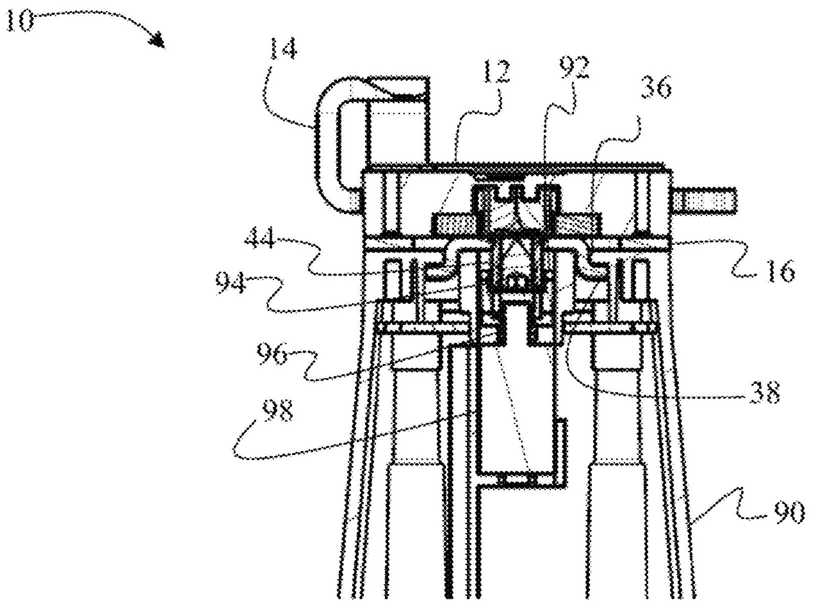
FIG. 10 depicts a front cross-sectional view of the latch plate coupled to the quick-release interface and the port engaged by the latch bolt.

FIG. 10 provides a front cross-sectional view of anti-theft device 10, showing latch bolt 92 in its extended position, in which port 44 of latch plate 16 is captured within receptacle 94 of latch bolt 92. FIG. 10 further depicts rails 38 of latch plate 16 residing underneath flanges 36. As explained above, this engagement prevents latch plate 16 from being lifted from quick-release interface 18.

FIGS. 11A-11B and 12A-12B depict that security device 10 can be configured to wirelessly charge article of merchandise 11. To achieve this functionality, a charging pad 13 is connected to securing bracket 12. Charging pad 13 houses an inductive coil configured to interact with an inductive coil of article of merchandise 11. Inductive coils are disclosed as an example of a wireless power transfer means, and other types of wireless power transfer devices (for example, Near Field Communication (NFC) antennas) fall within the scope of the invention. When article of merchandise 11 is secured within retaining arms 14 of securing bracket 12, charging pad 13 abuts the rear surface of article of merchandise 11, enabling the inductive coil of charging pad 13 to wirelessly supply electrical power to the inductive coil of article of merchandise 11. In this manner, charging pad 13 is configured to provide wireless charging capability to anti-theft device 10.

Figure 11A:
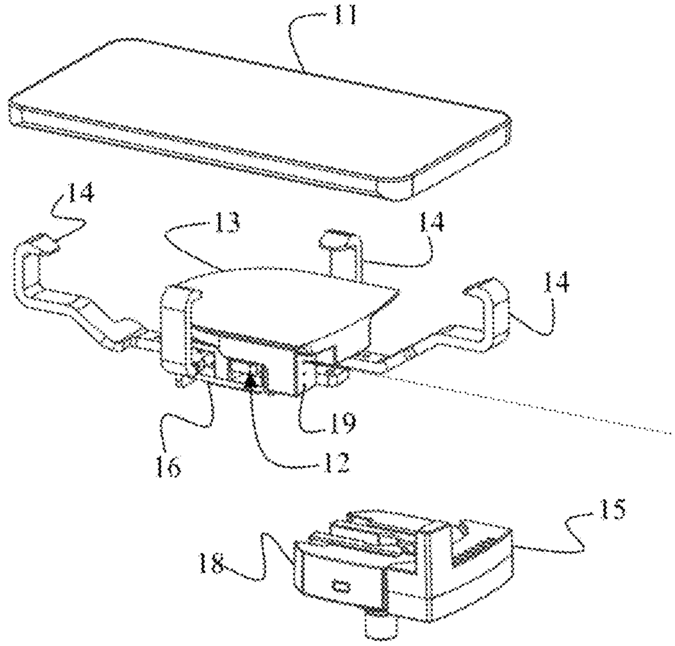
FIG. 11A is a perspective front-right view depicting an embodiment of the anti-theft device configured to wirelessly charge the article of merchandise.
Figure 11B:
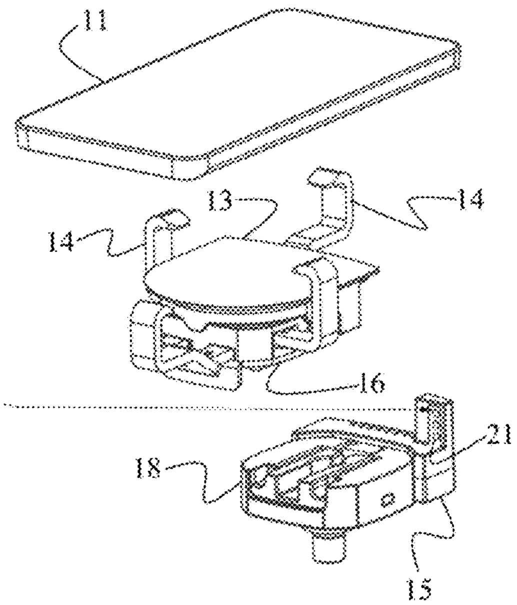
FIG. 11B is a perspective front-left view depicting the embodiment of the anti-theft device configured to wirelessly charge the article of merchandise.
Figure 12A:
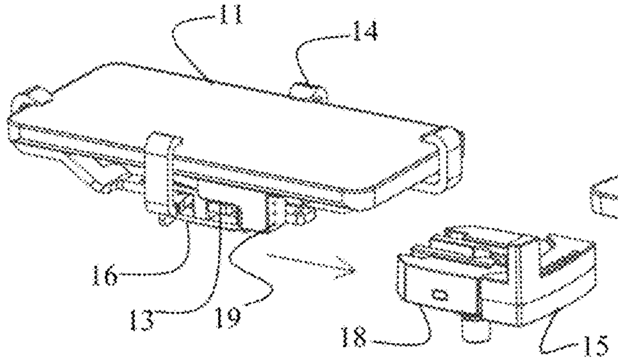
FIG. 12A is a perspective front-right view depicting the process of coupling the latch plate and the quick-release interface for the embodiment of the anti-theft device configured to wirelessly charge the article of merchandise.
Figure 12B:
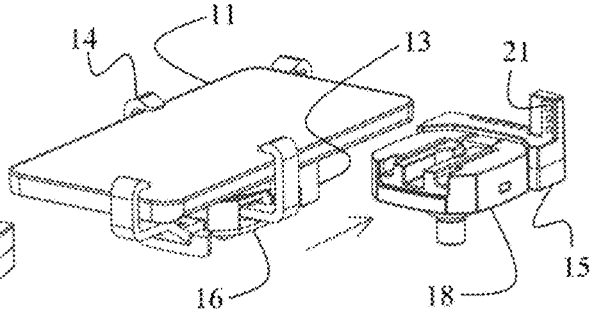
FIG. 12B is a perspective front-left view depicting the process of coupling the latch plate and the quick-release interface for the embodiment of the anti-theft device configured to wirelessly charge the article of merchandise.

FIGS. 11A-11B and 12A-12B further depict a wireless charging module 15 electrically coupled to quick-release interface 18. In this embodiment, wireless charging module 15—rather than power cable 22 (depicted in FIG. 2)—is electrically coupled to power port 17. FIGS. 11B and 12B depict that wireless charging module 15 has electrical contacts 21 that are configured to mate with complementary electrical contacts 19 of charging pad 13. In this manner, electrical power can be delivered from quick-release interface 18 to charging pad 13 via engagement between electrical contacts 19 and 21, thereby enabling the inductive coil of charging pad 13 wirelessly supply electrical power to article of merchandise 11. Accordingly, when quick-release interface 18 is resting on pedestal 20 and is electrically connected thereto, electrical power from pedestal 20 is delivered to charging pad 13, enabling charging pad 13 to wirelessly charge the battery of merchandise 11.

Therefore, based on the disclosure provided above, security device 10 can be efficiently adapted for either wired or wireless charging by selectively coupling either power cable 22 or wireless charging module 15 to power port 17. This feature enables security device 10 to provide universal charging capability to article of merchandise 11, irrespective of whether article of merchandise 11 is configured for wired or wireless charging.

Figure 13:
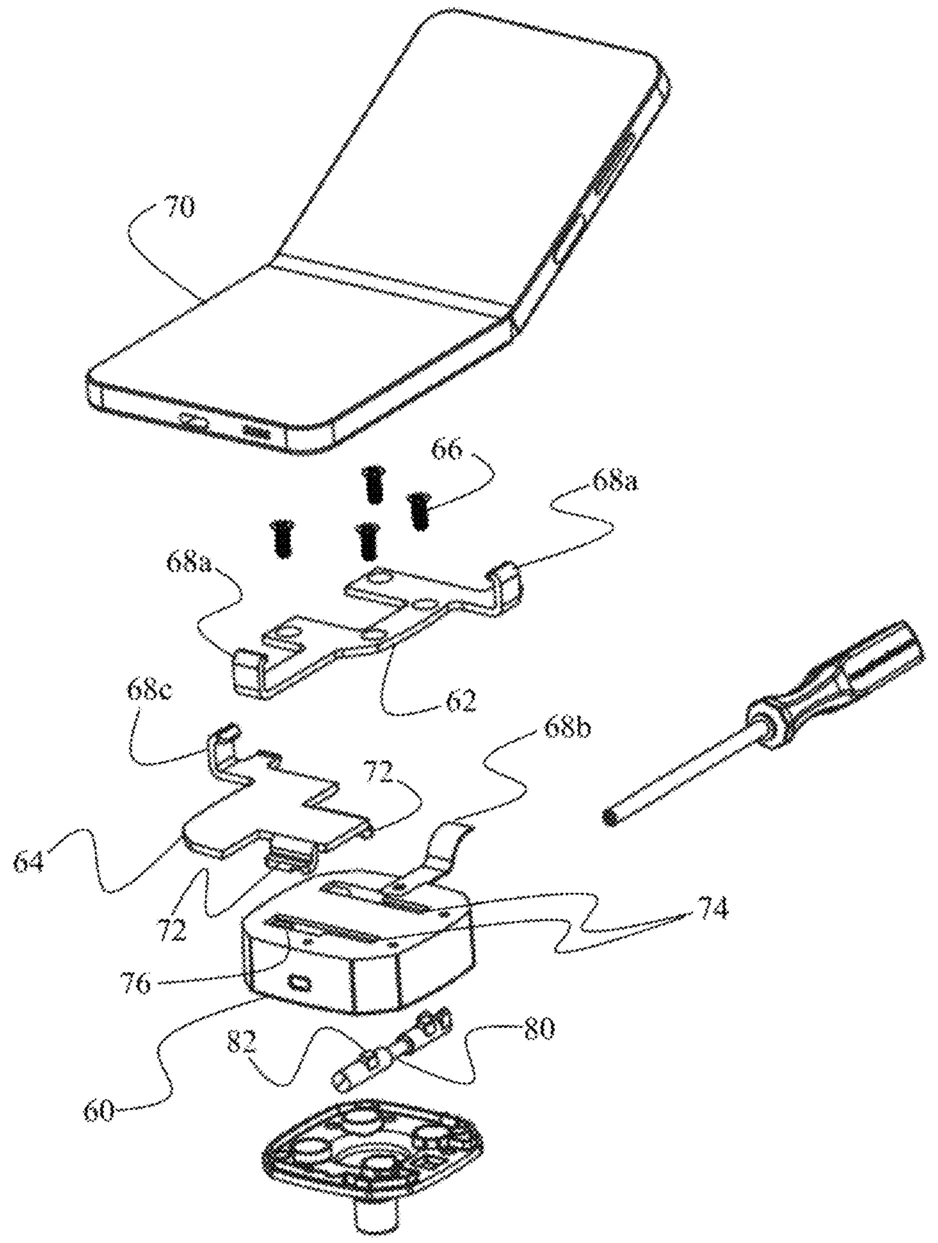
FIG. 13 is an exploded view of an embodiment of the invention configured to secure a horizontally folding article of merchandise.

FIG. 13 depicts an exploded view of another embodiment of the invention. This embodiment utilizes a quick-release interface 60, securing bracket 62, and latch plate 64. In this embodiment, securing bracket 62 is configured to be attached directly to quick-release interface 60 using fasteners 66 or another type of coupling means. Securing bracket 62 has one or more retaining arms 68*a* configured to receive lateral sides of article of merchandise 70. Retaining arms 68*a* can be static, rather than adjustable. This embodiment is especially adapted for securing article of merchandise 70 that are configured to fold, slide, roll or otherwise alter its shape.

FIG. 13 further depicts that one or more additional retaining arm 68*b* can be attached directly to quick-release interface 60. In this manner, article of merchandise 70 can be coupled to quick-release interface 60 via retaining arms 68*a* of securing bracket 62 and, if needed, additional retaining arms 68*b* attached directly to quick-release interface 60. FIG. 13 depicts that retaining arm 68*b* may be shaped differently than retaining arms 68*a* because retaining arm 68*b* is configured to secure a hinged side of article of merchandise 70 and, therefore, is shaped and structured to permit article of merchandise 70 to fold and unfold about its hinged edge.

FIG. 13 depicts that latch plate 64 has a retaining arm 68*c* integrated therein. On the underside, latch plate 64 comprises rails 72. FIG. 13 further depicts that quick-release interface 60 has two longitudinal channels 74. Each channel 74 has an opening 76 on the top surface of quick-release interface 74 and/or an opening on the lateral side of quick-release interface 74 (as depicted in FIGS. 4-6). Each channel 74 also has a flange partially restricting the opening of channel 74.

A torsion latch 80 is rotationally disposed within quick-release interface 60. Torsion latch 80 can be rotated about its center axis between a first position, in which teeth 82 protrude into channels 74, and a second position, in which teeth 82 are retracted away from channels 74. A torsion spring can be used to bias torsion latch 80 toward the first position in which teeth 82 protrude into the channels 74.

Figure 14A:
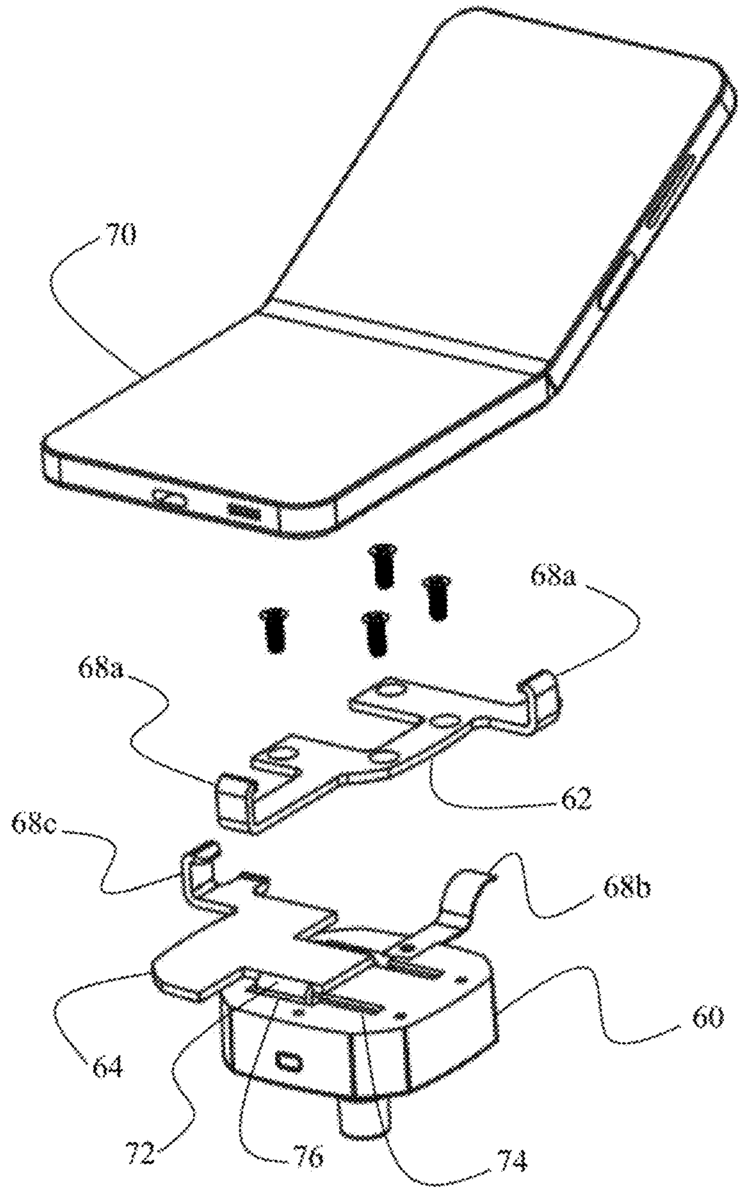
FIG. 14A is a perspective front view of the embodiment of the invention configured to secure a horizontally folding article of merchandise, depicting the rails of the latch plate inserted into opening of longitudinal channels of the quick-release interface.
Figure 14B:
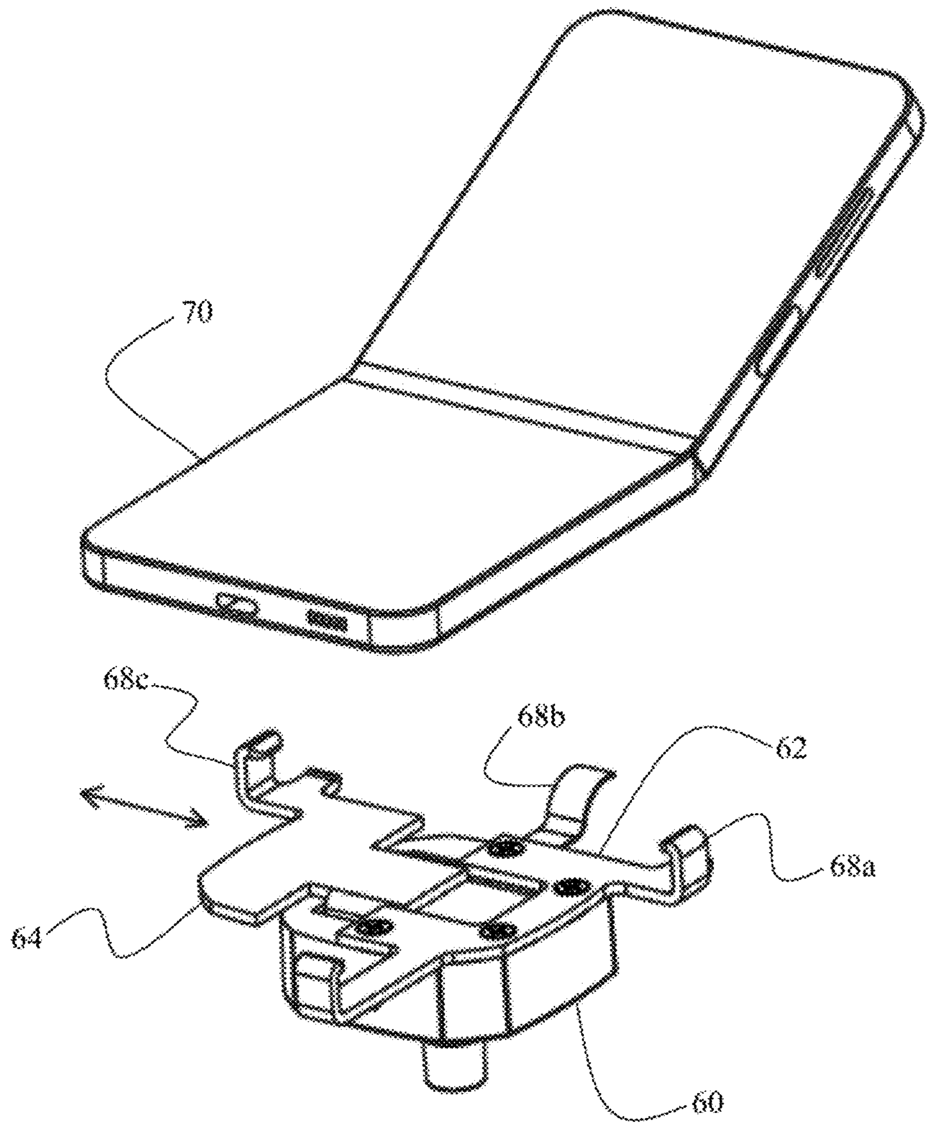
FIG. 14B is a perspective front view of the embodiment of the invention configured to secure a horizontally folding article of merchandise, depicting the securing bracket affixed to the quick-release interface and the latch plate slidingly disposed within the longitudinal channels of the quick-release interface.

FIGS. 14A and 14B depicts that latch plate 64 is configured to interconnect with quick-release interface 60 by inserting rails 72 into openings 76 of channels 74. At this point, the distance between retaining arm 68*c* of latch plate 64 and opposite retaining arm 68*a* of securing bracket 62 is greater than the width of article of merchandise 70.

Figure 15A:
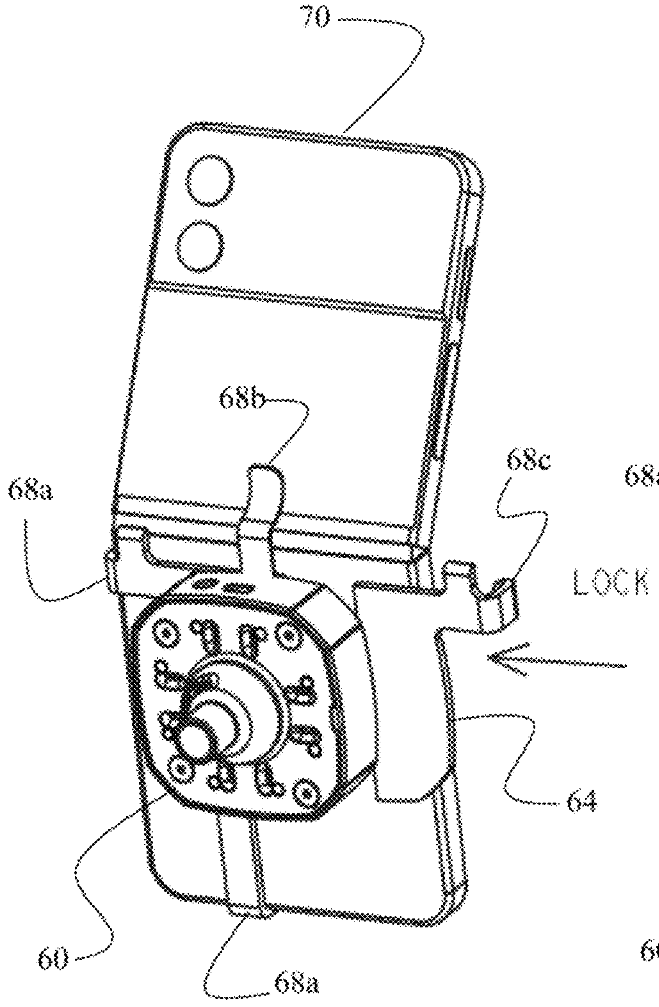
FIG. 15A is a perspective back view of the embodiment of the invention configured to secure a horizontally folding article of merchandise, depicting the latch plate in an open position.
Figure 15B:
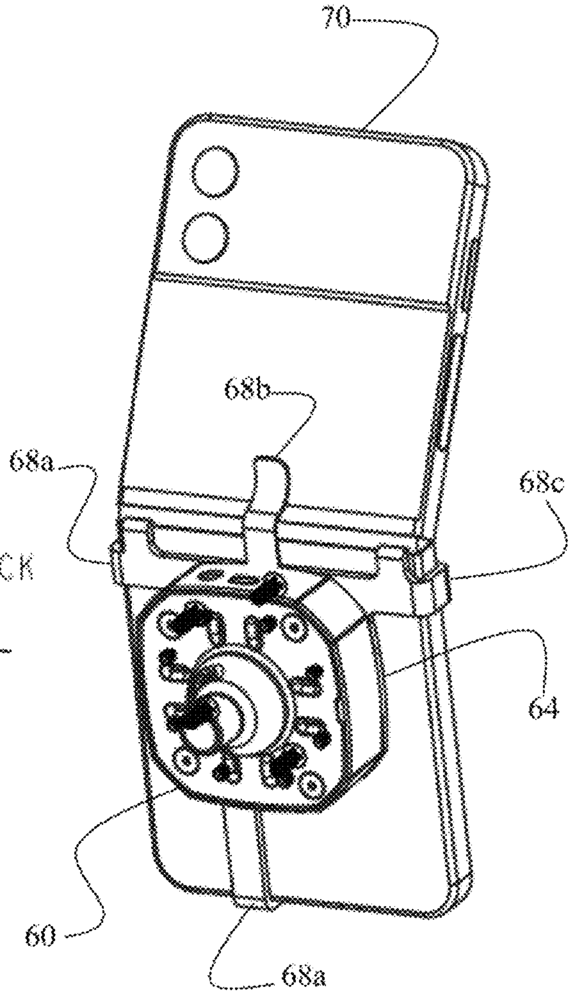
FIG. 15B is a perspective back view of the embodiment of the invention configured to secure a horizontally folding article of merchandise, depicting the latch plate in a locked position.

To secure article of merchandise 70, it is positioned on top of securing bracket 62 and latch plate 64, as depicted in FIG. 15A. Next, a force is applied onto latch plate 64, causing rails 72 to slide within channels 74. In this manner, latch plate 64 is configured to slide relative to quick-release interface 60, until retaining arms 68*a* and 68*c* simultaneously capture the lateral side of article of merchandise 70, as depicted in FIG. 15B.

As disclosed above with reference to FIG. 13, quick-release interface 60 has a locking mechanism, which comprises a torsion latch 80 having one or more teeth 82. When rails 72 of latch plate 64 slide within channels 74, they apply a force onto teeth 82 causing torsion latch 80 to rotate into its second position. As rails 72 continue to slide within channels 74, notches disposed on rails 72 become aligned with teeth 82. At this point, the biasing force of the spring causes torsion latch 80 to rotate into its first position, in which teeth 82 enter into the notches of rails 72, thereby immobilizing rails 72 against longitudinal movement within channels 74. In this manner, when torsion latch 80 is in its first position and latch plate 64 is coupled to quick-release interface 60, torsion latch 80 immobilizes latch plate 64 relative to quick-release interface 60. In this locked position, depicted in FIG. 15B, article of merchandise 70 is secured within retaining arms 68*a*, 68*b*, and 68*c*.

Figure 15C:
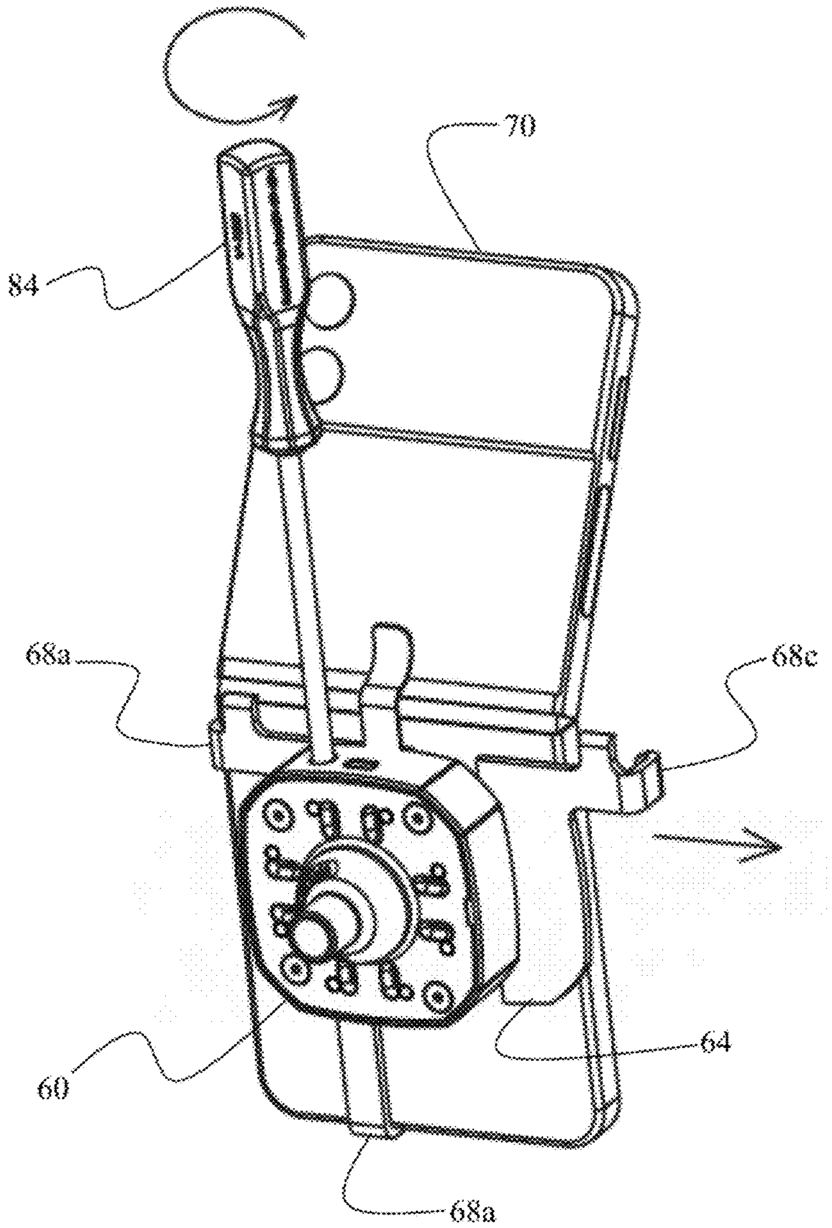
FIG. 15C is a perspective back view of the embodiment of the invention configured to secure a horizontally folding article of merchandise, depicting a tool inserted into an access port within the quick-release interface to retract the latch away from the latch plate, thereby unlocking the anti-theft device and releasing the article of merchandise therefrom.
Figure 16A:
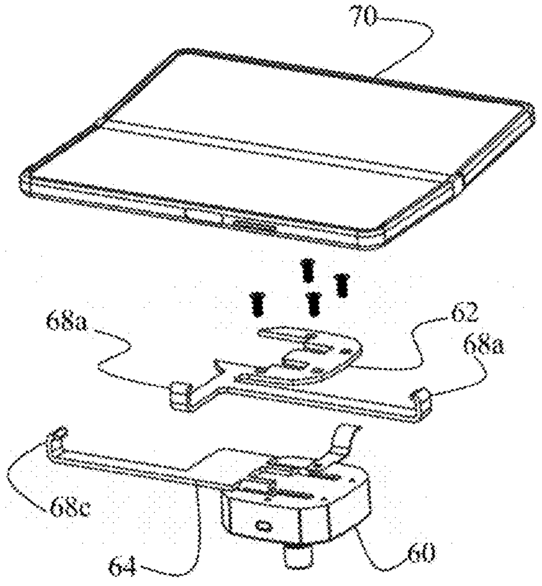
FIG. 16A is a perspective front view of the embodiment of the invention configured to secure a vertically folding article of merchandise, depicting the rails of the latch plate inserted into opening of longitudinal channels of the quick-release interface.
Figure 16B:
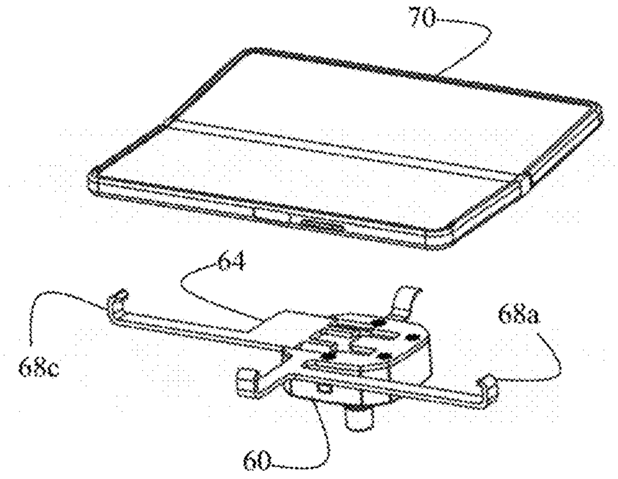
FIG. 16B is a perspective front view of the embodiment of the invention configured to secure a vertically folding article of merchandise, depicting the securing bracket affixed to the quick-release interface and the latch plate slidingly disposed within the longitudinal channels of the quick-release interface.
Figure 17A:
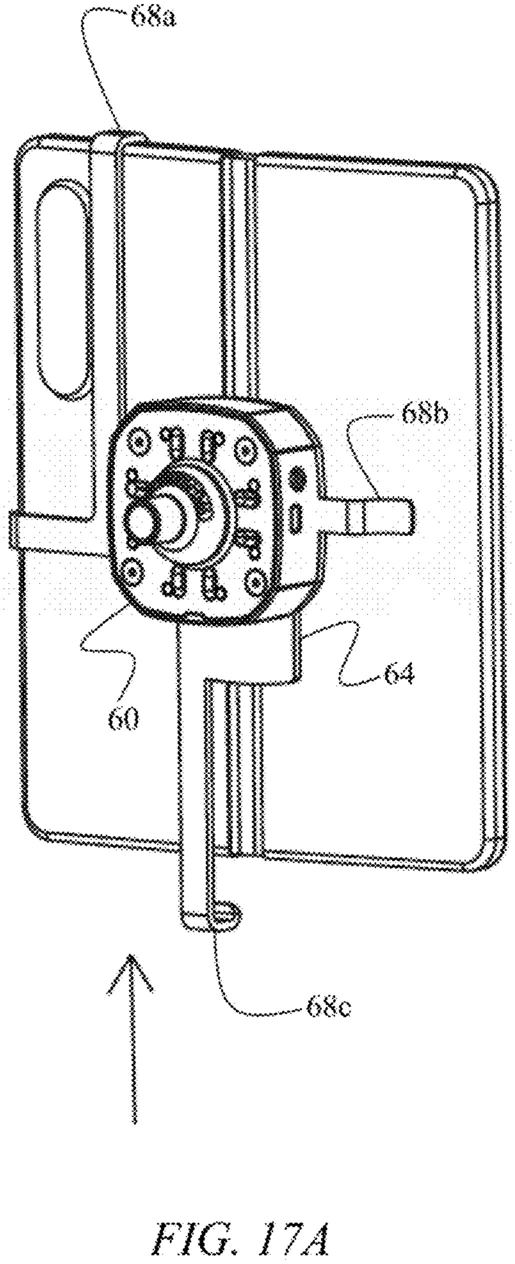
FIG. 17A is a perspective back view of the embodiment of the invention configured to secure a vertically folding article of merchandise, depicting the latch plate in an open position.
Figure 17B:
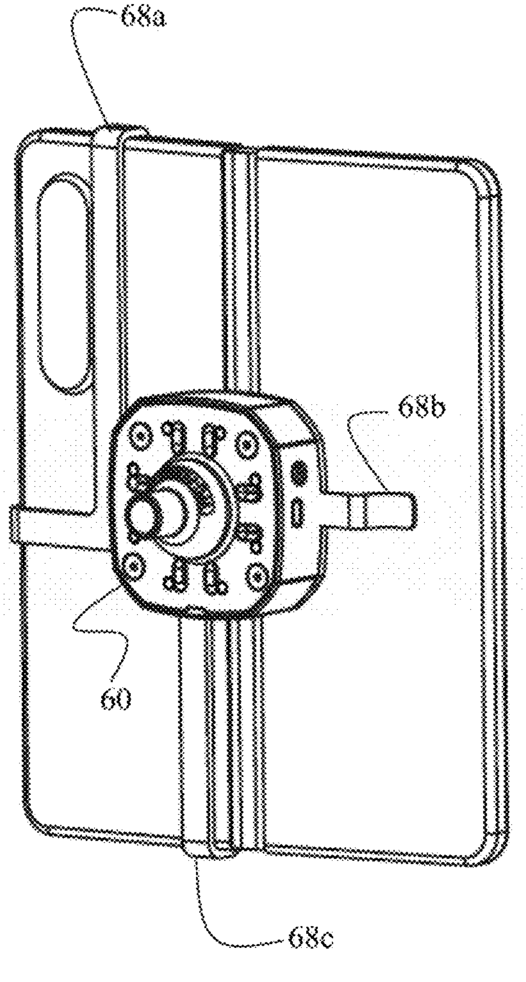
FIG. 17B is a perspective back view of the embodiment of the invention configured to secure a vertically folding article of merchandise, depicting the latch plate in a locked position.
Figure 17C:
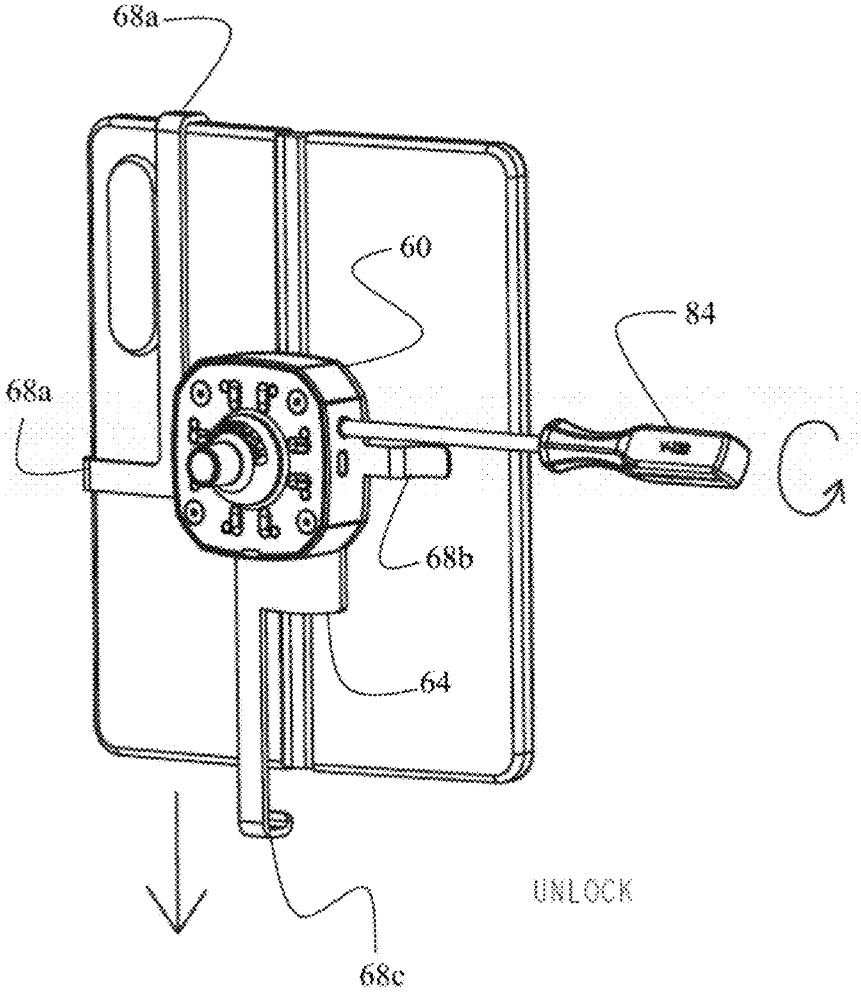
FIG. 17C is a perspective back view of the embodiment of the invention configured to secure a vertically folding article of merchandise, depicting a tool inserted into an access port within the quick-release interface to retract the latch away from the latch plate, thereby unlocking the anti-theft device and releasing the article of merchandise therefrom.

FIG. 15C depicts that, to release article of merchandise 70, a tool 84 is inserted into quick-release interface 60 via a designated port. Tool 84 engages torsion latch 80 and can be used to rotate latch 80 into its second position, in which teeth 82 exit notches of rails 72, thereby releasing latch plate 64. At this point, rails 72 can slide within channels 74 to retract retaining arm 68*c* of latch plate 64 away from article of merchandise 70. When the distance between retaining arms 68*c* of latch plate 64 and 68*a* of securing bracket 62 becomes greater than the width of article of merchandise 70, article of merchandise 70 can be removed from the anti-theft device.

FIGS. 16A-16B and 17A-17C depict that latch plate 64 and securing bracket 62 may be designed to accommodate a specific shape of a particular article of merchandise 70. In this manner, the anti-theft device can be readily adapted to secure differently shaped articles of merchandise 70 simply by changing the lengths and/or configurations of arms 68 of latch plate 64 and/or securing bracket 62.

Figure 18A:
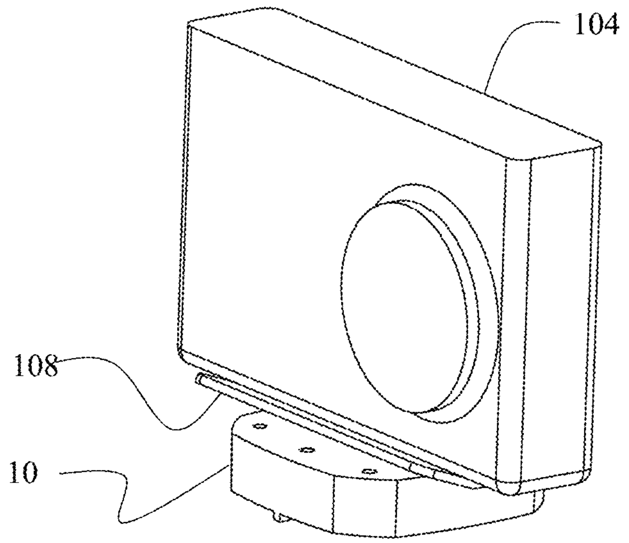
FIG. 18A is a perspective view of an embodiment of the invention configured to secure an article of merchandise having a threaded mounting port.
Figure 18B:
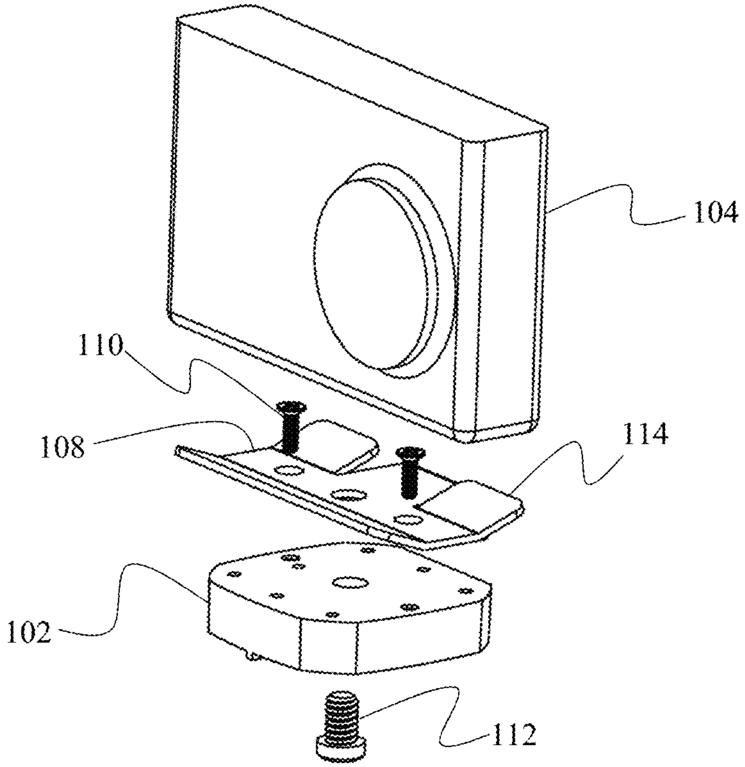
FIG. 18B is a perspective exploded view of the embodiment of the invention configured to secure an article of merchandise having a threaded mounting port.
Figure 18C:
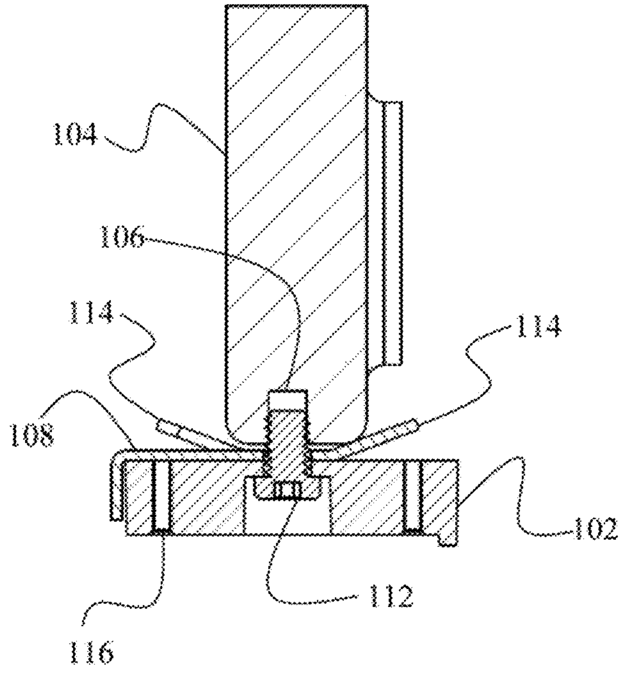
FIG. 18C is a cross-sectional side view of the embodiment of the invention configured to secure an article of merchandise having a threaded mounting port.

FIGS. 18A-18C depict an embodiment of the invention in which a securing bracket 102 is configured to secure article of merchandise 104 having a threaded mounting port 106. A retaining plate 108 is affixed to securing bracket 102, for example with fasteners 110. Both securing bracket 102 and securing plate 108 have apertures that are configured to align with one another and with mounting port 106 of article of merchandise 104. A screw 112 is inserted from underside of securing bracket 12 and is threaded into mounting port 106 of article of merchandise 104, thereby coupling article of merchandise 104 to securing bracket 102 (depicted in FIG. 18C). Securing plate 108 has angled leaflets 114 that prevent rotation of article of merchandise 14 relative to securing plate 108. In this manner, fasteners 110 are concealed underneath article of merchandise 104 when it is coupled to securing bracket 102 and cannot be accessed until article of merchandise 104 is removed from bracket 102.

FIG. 18C further depicts that securing bracket 102 includes threaded holes 116 for attachment of latch plate 16. When latch plate 16 is attached to securing bracket 102, screw 112 is concealed and cannot be accessed until latch plate 16 is decoupled from securing bracket 102. Latch plate 16 is configured to releasably couple to quick-release interface 18 as described above and shown in FIGS. 1-10. When latch plate 16 is coupled to quick-release interface 18, the fasteners attaching latch plate 16 to securing bracket 102 are inaccessible. Thus, to remove article of merchandise 104 from securing bracket 102, the latch plate 16 must be decoupled from quick-release interface 18, unscrewed from securing bracket 102, only then providing access to screw 112 that secures article of merchandise 104 to securing bracket 102. In this manner, this embodiment of the anti-theft device provides multi-layer security measures that protect article of merchandise 104 against theft.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:

a pedestal affixed to a display counter, the pedestal having a quick-release interface;

a securing bracket configured to couple to the article of merchandise, the securing bracket having a latch plate configured to slidingly mate with the quick-release interface;

a first rail disposed on an underside of the latch plate and a first longitudinal channel disposed within the quick-release interface, wherein the first rail of the latch plate is configured to linearly translate within the first longitudinal channel of the quick-releasing interface;

a flange disposed within the first longitudinal channel and configured to engage the first rail of the latch plate when the first rail is positioned within the first longitudinal channel, wherein engagement between the first rail of the latch plate and the flange of the quick-release interface prevents the latch plate from being lifted from the quick-release interface;

a latch having a first position and a second position, wherein in the first position, the latch is configured to engage the latch plate thereby restraining the latch plate against relative translation with respect to the quick-release interface, thus coupling the securing bracket to the quick-release interface, and wherein in the second position, the latch is configured to disengage the latch plate thereby enabling the first rail to linearly translate within and exit the first longitudinal channel, thus decoupling the securing bracket from the quick-release interface and enabling removal of the article of merchandise from the pedestal; and a biasing element urging the latch into the first position.

2. The anti-theft device of claim 1, further comprising a solenoid or a motor disposed within the pedestal and configured to transition the latch from the first position into the second position against a force exerted onto the latch by the biasing element.

3. The anti-theft device of claim 1, wherein in the first position, the latch is configured to engage the rail of the latch plate.

4. The anti-theft device of claim 1, wherein in the first position, the latch is configured to engage a protrusion disposed on the underside of the latch plate.

5. The anti-theft device of claim 4, further comprising a second longitudinal channel disposed within the quick-release interface, wherein the protrusion on the underside of the latch plate is configured to linearly translate within the second longitudinal channel of the quick-release interface.

6. The anti-theft device of claim 5, wherein in the first position, the latch is configured to enter into the second longitudinal channel thereby blocking the protrusion of the latch plate against linear retraction within the second longitudinal channel, thereby immobilizing the protrusion within the second longitudinal channel and preventing relative movement of the latch plate relative to the quick-release interface.

7. The anti-theft device of claim 6, further comprising a solenoid disposed within the pedestal and operatively connected to the latch, wherein the solenoid is configured to retract the latch into the second position thereby clearing a path of travel of the protrusion of the latch plate within the second longitudinal channel of the quick-release interface.

8. The anti-theft device of clam 7, wherein the solenoid is configured to retract the latch into the second position against a biasing force exerted by the biasing element onto the latch.

9. The anti-theft device of claim 5, wherein the latch is a latch bolt having a sloped surface and wherein the protrusion on the underside of the latch plate is configured to progressively engage the sloped surface of the latch bolt as the protrusion is advanced within the first longitudinal channel thereby progressively displacing the latch bolt toward the second position against a biasing force exerted onto the latch bolt by the biasing element.

10. The anti-theft device of claim 9, wherein the latch bolt has a receptacle open to the sloped surface thereof and configured to receive the protrusion of the latch plate therein.

11. The anti-theft device of claim 10, wherein the biasing element is configured to return the latch bolt into the first position when the protrusion of the latch plate comes into alignment with the receptacle of the latch bolt.

12. The anti-theft device of claim 5, further comprising a third longitudinal channel disposed within the quick-release interface and a second rail disposed on the underside of the latch plate, wherein the second rail is configured to slidingly reside within the third longitudinal channel.

13. The anti-theft device of claim 4, further comprising a plurality of retaining arms in a sliding relation relative to the securing bracket, wherein the plurality of retaining arms is configured to secure the article of merchandise therebetween.

14. The anti-theft device of claim 13, wherein the protrusion on the underside of the latch plate has a port for accessing a locking mechanism configured to selectively immobilize the plurality of retaining arms against relative movement with respect to the securing bracket, and wherein the locking mechanism is inaccessible via the port when the latch plate is coupled to the quick-release interface.

15. The anti-theft device of claim 1, further comprising an electrical cable configured to establish an electrical connection between the article of merchandise and the quick-release interface.

16. The anti-theft device of claim 1, wherein the securing bracket is configured to couple to the article of merchandise via a screw.

17. The anti-theft device of claim 16, wherein the screw is inaccessible when the latch plate is coupled to the quick-release interface.

18. The anti-theft device of claim 17, wherein the securing bracket has one or more leaflets configured to restrict the article of merchandise against rotation about a longitudinal axis of the screw.

19. The anti-theft device of claim 18, wherein the one or more leaflets are disposed on a securing plate configured to be affixed to the securing bracket via fasteners, and wherein the fasteners are inaccessible when the securing bracket is coupled to the article of merchandise.

20. A method of securing an article of merchandise using an anti-theft device, comprising:

coupling a securing bracket to the article of merchandise, the securing bracket having a latch plate configured to releasably mate with a quick-release interface disposed on a pedestal affixed to a display counter;

positioning a first rail disposed on an underside of the latch plate within a first longitudinal channel disposed on the quick-release interface wherein the first rail of the latch plate is configured to linearly translate within the first longitudinal channel of the quick-releasing interface, and wherein the first longitudinal channel has a flange configured to engage the first rail and configured to prevent the latch plate from being lifted from the quick-release interface;

slidingly advancing the latch plate relative to the quick-release interface, wherein a latch is configured to engage the latch plate thereby restraining the latch plate against relative translation with respect to the quick-release interface, thus coupling the securing bracket to the quick-release interface;

retracting the latch against a biasing force exerted onto the latch by a biasing element urging the latch toward the first position thereby_transitioning the latch from a first position in which the latch engages the latch plate into a second position in which the latch disengages the latch plate, thus enabling the first rail to slidingly retract within and exit the first longitudinal channel; and slidingly retracting the latch plate relative to the quick release mechanism to remove the first rail of the latch plate from the first longitudinal channel, thereby decoupling the securing bracket from the quick-release interface and removing the article of merchandise from the pedestal.

21. The method of claim 20, further comprising the step of actuating a solenoid or a motor disposed within the pedestal to retract the latch against the biasing force.

22. The method of claim 20, wherein in the first position, the latch is configured to engage a protrusion disposed on the underside of the latch plate.

23. The method of claim 22, wherein the latch is a latch bolt having a sloped surface and wherein the step of slidingly advancing the latch plate relative to the quick-release interface causes the protrusion on the underside of the latch plate to progressively engage the sloped surface of the latch bolt as the protrusion is advanced within the first longitudinal channel thereby progressively displacing the latch bolt toward the second position against the biasing force exerted onto the latch bolt by a the biasing element.

24. The method of claim 23, wherein the biasing element returns the latch bolt into the first position when the protrusion of the latch plate comes into alignment with an opening on the sloped surface of the latch bolt.

25. The method of claim 23, further comprising a step of actuating a solenoid disposed within the pedestal to transition the latch into the second position against the biasing force.

26. The method of claim 25, wherein the solenoid is actuated using a wireless remote control device.

27. The method of claim 20, further comprising a step of operating a locking mechanism disposed within the securing bracket to release a plurality of retaining arms slidingly connected to the securing bracket and extending one or more of the plurality of retaining arms relative to the securing bracket to release the article of merchandise therefrom, wherein the locking mechanism is inaccessible while the latch plate is coupled to the quick-release interface.

* * * * *